United States Patent [19]

Irvin et al.

[11] 3,717,848

[45] Feb. 20, 1973

[54] STORED REFERENCE CODE CHARACTER READER METHOD AND SYSTEM

[75] Inventors: Donald L. Irvin, Clarksville, Md.; Alan J. Rider, Reston, Va.

[73] Assignee: Recognition Equiopment Incorporated, Irving, Tex.

[22] Filed: June 2, 1970

[21] Appl. No.: 42,694

[52] U.S. Cl.....................340/146.3 Q, 340/146.3 MA

[51] Int. Cl...............................................G06k 9/08

[58] Field of Search........340/146.3 Q, 146.3 MA, 146.3 R

[56] References Cited

UNITED STATES PATENTS

| | | | |
|---|---|---|---|
| 3,573,730 | 4/1971 | Andrews et al. | 340/146.3 Q |
| 3,576,534 | 4/1971 | Steinberger | 340/146.3 Q |
| 3,289,164 | 11/1966 | Rabinow | 340/146.3 H |
| 3,559,169 | 1/1971 | Gillmann et al. | 340/146.3 H |
| 3,152,318 | 10/1964 | Swift, Jr. | 340/146.3 Q |
| 3,582,898 | 6/1971 | LeMay | 340/146.3 R |
| 3,560,927 | 2/1971 | Rabinow et al. | 340/146.3 MA |

*Primary Examiner*—Maynard R. Wilbur
*Assistant Examiner*—Leo H. Boudreau
*Attorney*—Richards, Harris & Hubbard

[57] ABSTRACT

Multi-level coded data representing a plurality of laterally spaced vertical scans of a character field passes serially through a multi-column, multi-row shift register synchronously with the scan operation. When a character is centered in the register, its height is measured and the register output is fed to an image register at an input position dependent upon character height. Each character representation is thus loaded with precision as to location in the image register. Subsequently, the loaded character is compared with each of a library of characters in a read only memory. More particularly, each element from the read only memory is compared with the element at a corresponding character location in the image register and with each of eight contiguous locations. A count is accumulated and stored indicative of the number of times a mismatch criteria is satisfied from the element comparison. A code is then generated to identify the character from the read only memory for which the count is optimum.

21 Claims, 16 Drawing Figures

INVENTORS
DONALD L. IRVIN
ALAN J. RIDER

Richards, Harris & Hubbard
ATTORNEYS

INVENTORS:
DONALD L. IRVIN
ALAN J. RIDER

Richards, Harris & Hubbard
ATTORNEYS

INVENTORS:
DONALD L. IRVIN
ALAN J. RIDER

Richards, Harris & Hubbard
ATTORNEYS

INVENTORS:
DONALD L. IRVIN
ALAN J. RIDER

Richards, Harris & Hubbard
ATTORNEYS

INVENTORS:
DONALD L. IRVIN
ALAN J. RIDER

Richards, Harris & Hubbard
ATTORNEYS

INVENTORS:
DONALD L. IRVIN
ALAN J. RIDER

Richards, Harris & Hubbard
ATTORNEYS

STORED REFERENCE CODE CHARACTER READER METHOD AND SYSTEM

This invention relates to automatic character recognition, and more particularly to conditioning and comparison between signals representing vertical sweeps across a character field and signals stored in a read only memory. In a more specific aspect, the invention relates to the detection of a given character in a temporary storage unit and the transfer thereof to a preselected location in an image register from which the stored data is extracted for repeated comparison with each of the corresponding sets of data stored in a read only memory. The memory character which, in comparison, produces the optimum error, is selected as the character in the image register.

Automatic optical character recognition systems have been advised for many specific applications and requirements. Considerations such as reliability and simplicity have been found to be challenging and conflicting goals in this field. In general, reliability is a consideration which supercedes others, including simplicity.

The present invention is directed to a system in which data representing a character signifying a plurality of columnar samples of the field on which a character reposes is precisely positioned in an image register. Corresponding columnar data stored in a read only memory is then compared with the data stored in the image register to identify the closest match. The read only memory permits the interrogation of an entire library of characters in a time interval less than involved in a columnar scan of the character field by the input reader system.

More particularly, in accordance with the invention, a multicolumn, multirow image register is loaded with character representations for comparison with representations of a set of characters stored in predetermined locations in a memory. Preparatory thereto, vertical paths laterally spaced in a character field are sequentially scanned. A sync signal is generated in predetermined time relation to the start of each scan cycle. Signals produced by scanning are serially introduced into a shift register having rows and columns of storage locations substantially in excess of those in the image register. The presence of a character portion in all columns of the shift register is continuously sensed for producing a center signal when a set of character portions is centered in the shift register. In response to the center signal, all rows of the shift register are sensed to establish a vertical profile of the centered character. Data from the shift register continuously flows to an image register buffer at an input point established for the centered character corresponding with a trailing extremity of the profile. Each column of information in the buffer register is frozen in position as the trailing extremity enters the buffer register. At a predetermined time following the next sync pulse, the contents of the buffer register are shifted in parallel into the image register.

In accordance with a further aspect of the invention, characters are simulated by storage in the image register of a binary code for elemental areas of said character as above described. Like codes are stored in a memory for each member of a set of characters to be identified. The state of each memory element is compared with the state of each corresponding image element and with each image element contiguous thereto. A count of the optimum number of mismatches encountered in the comparisons between said elements for each said member is stored and a code is then generated to select the member for which said count is optimum.

For a more complete understanding of the invention and for further objects and advantages thereof, reference may now be made to the following description taken in conjunction with the accompanying drawings, in which.

Figure 1:
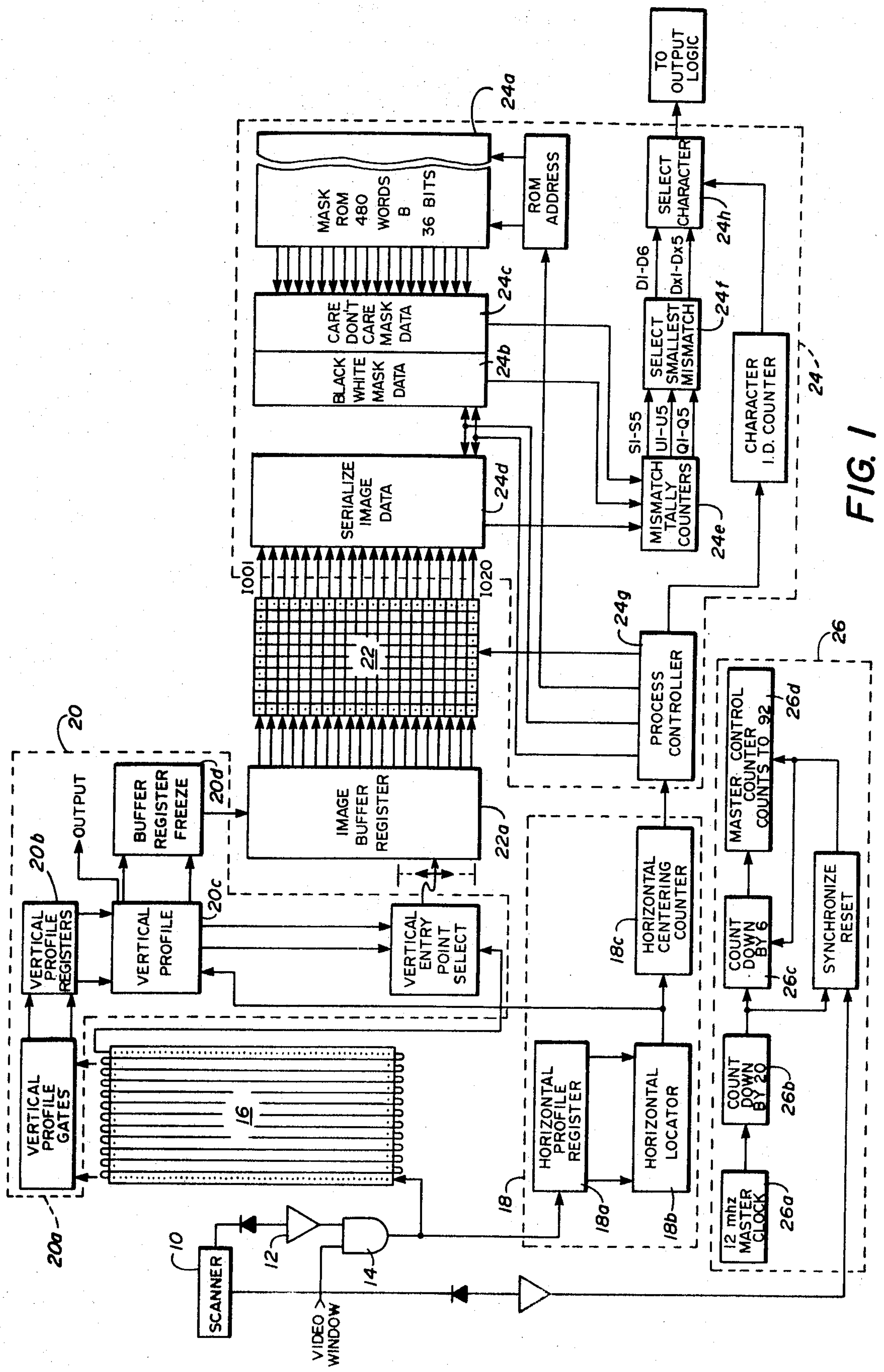
FIG. 1 is a block diagram of one embodiment of the invention.
Figure 11A:
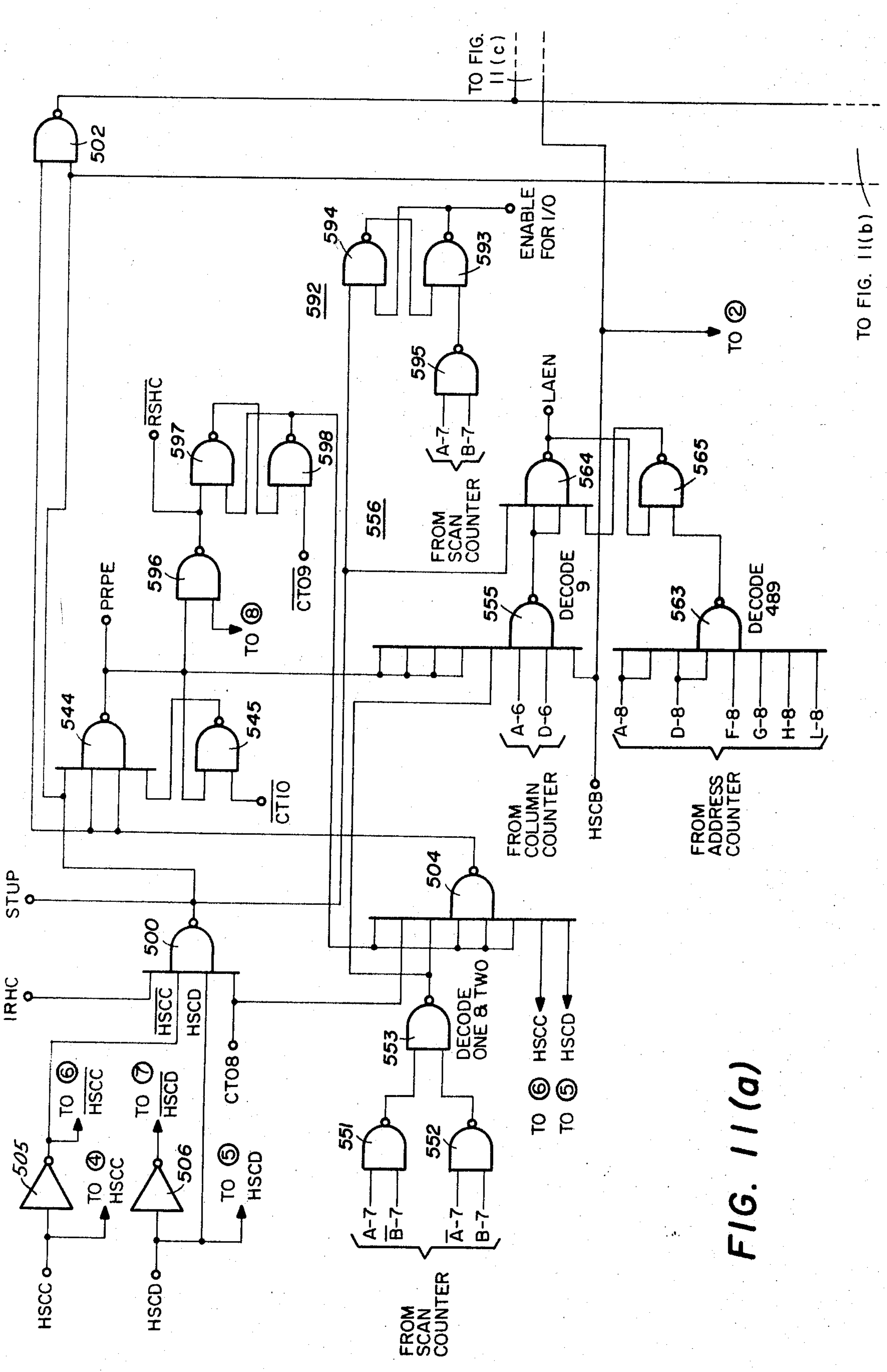
Figure 11B:
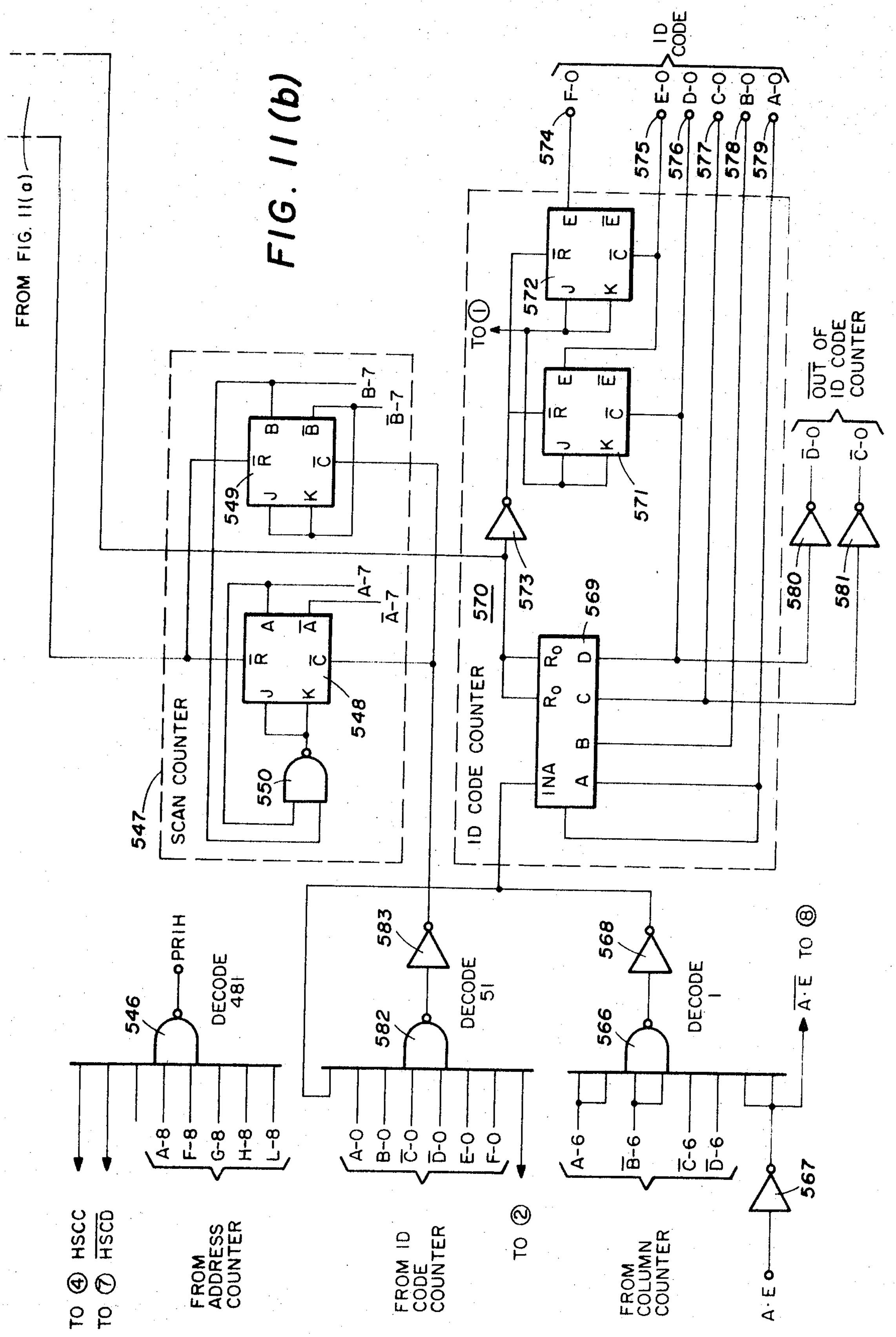
Figure 11C:
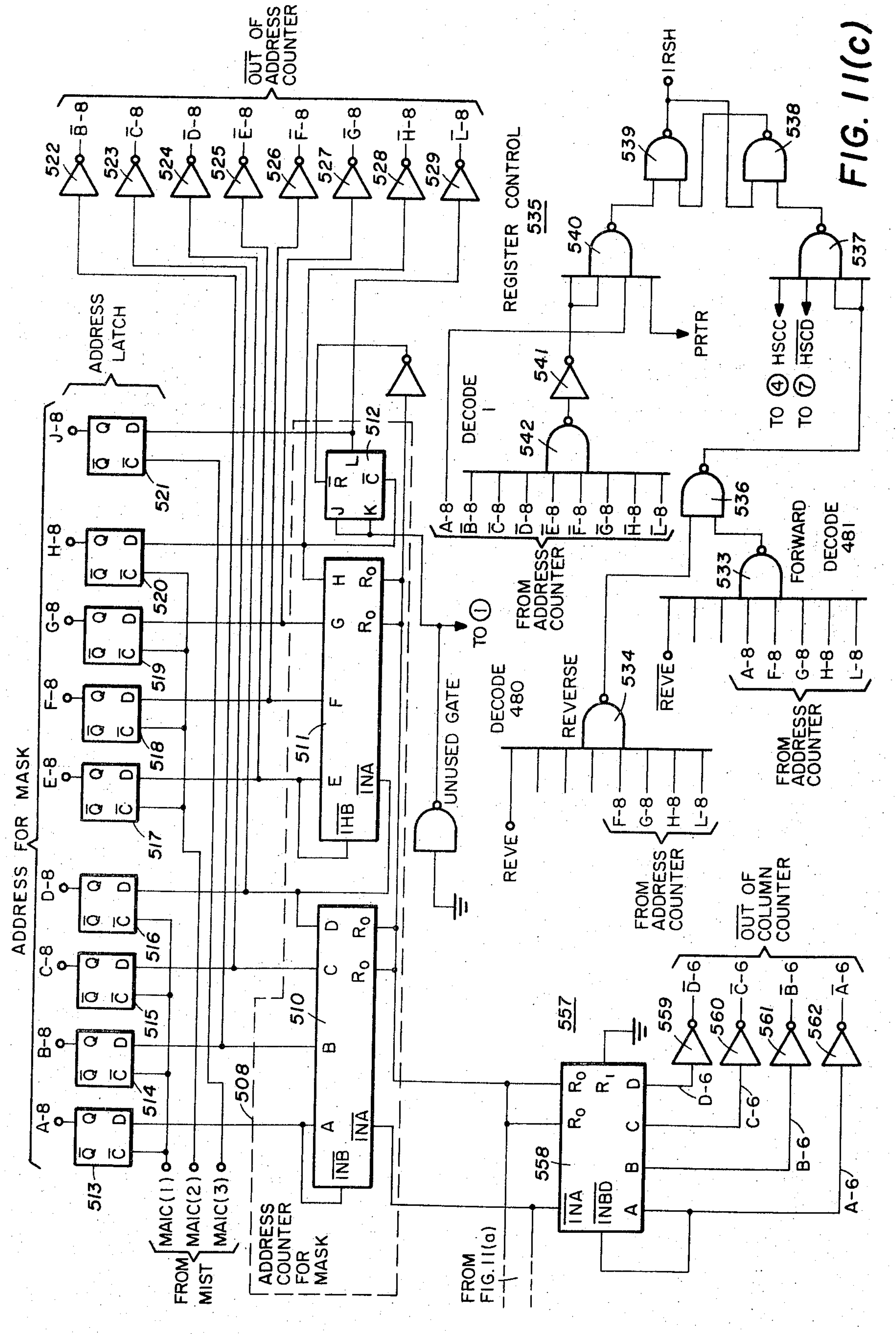
Figure 12:
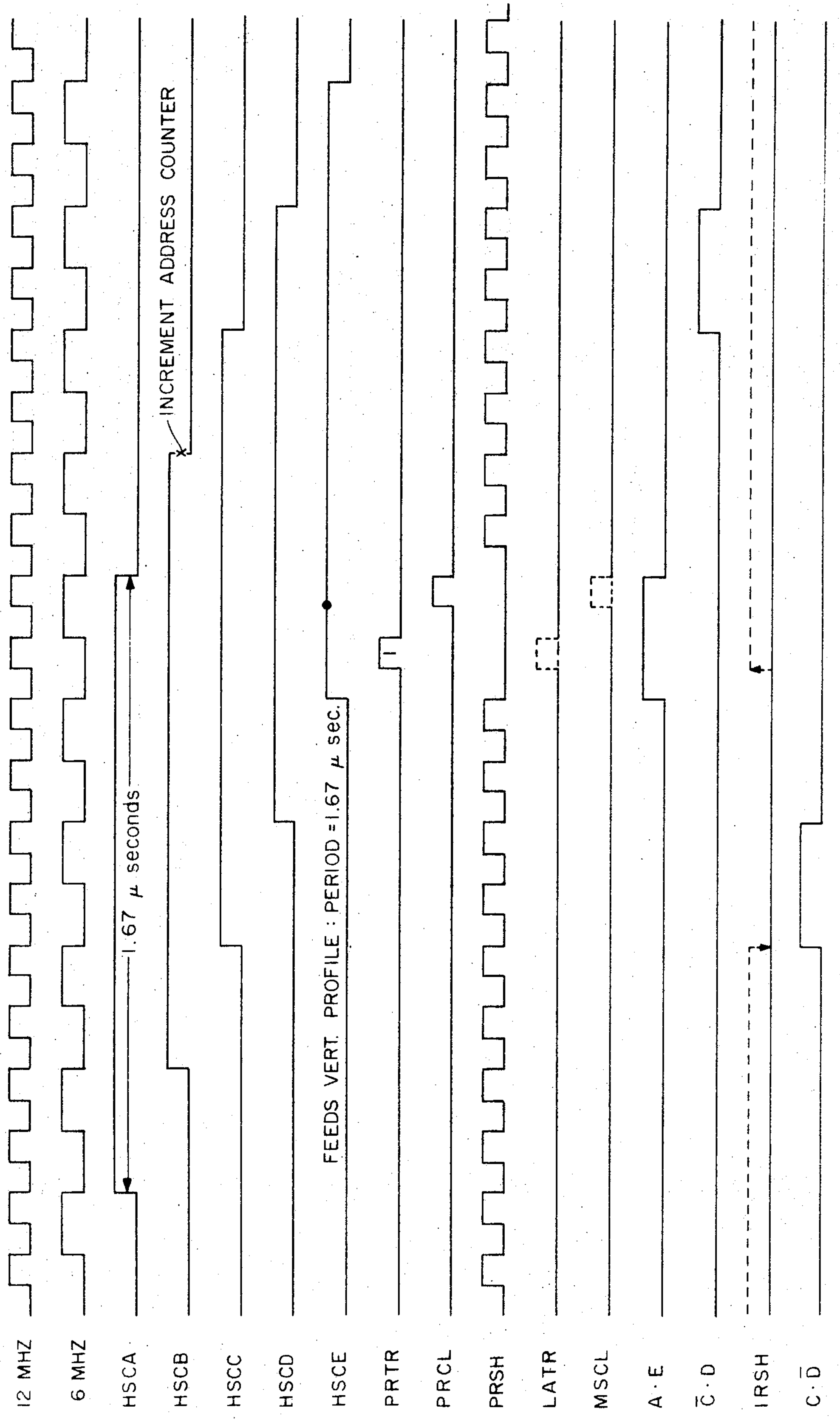
Figures 13, 14:
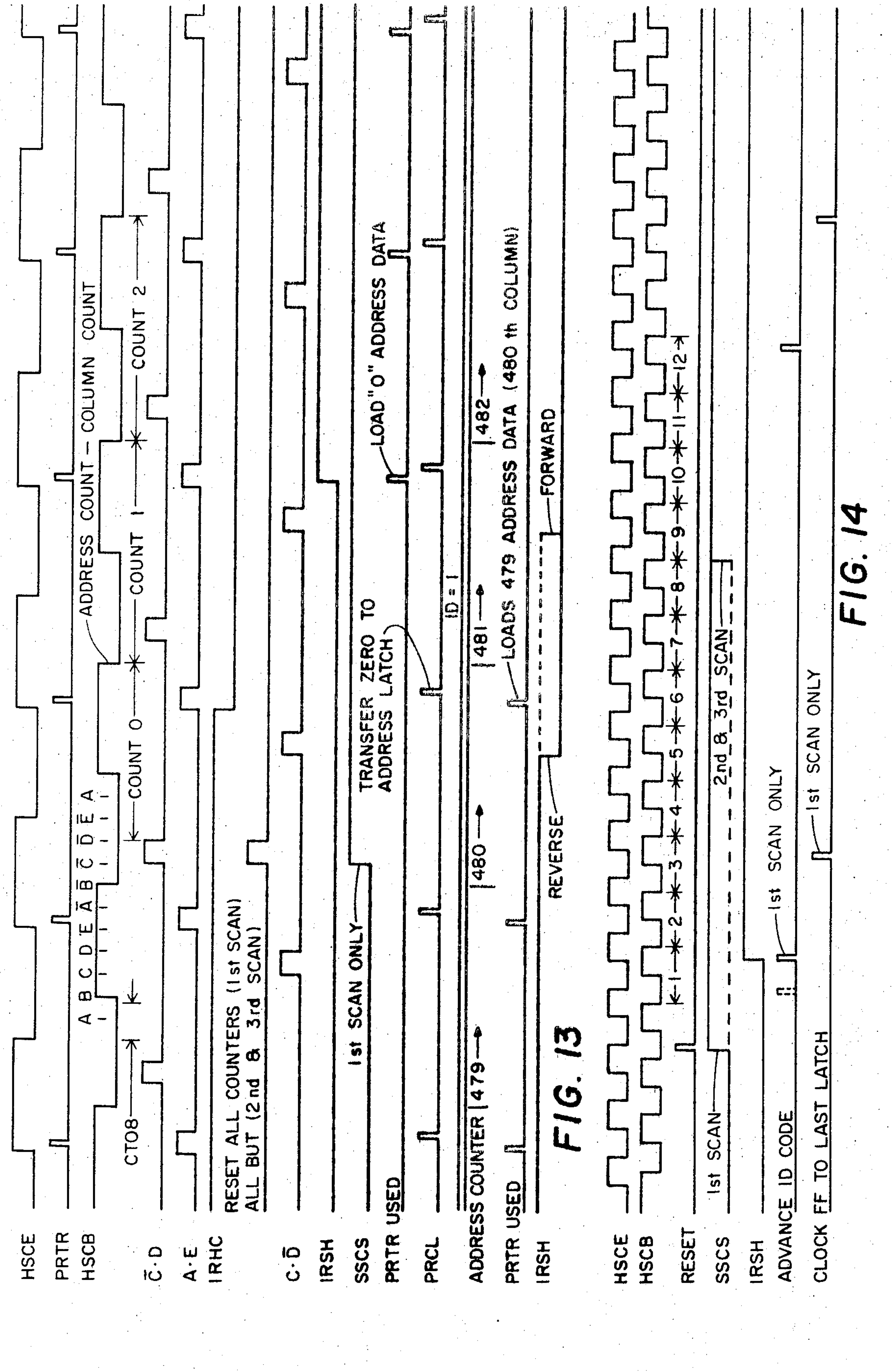

FIGS. 11*a*-11*c* comprise a block diagram of the process controller of FIG. 1; and FIGS. 12–14 illustrate timing signals for sequencing the system operation.

The present invention is directed to a system and a method for the identification of characters of predetermined font or type. Simulations of each character to be identified are stored in a read only memory to correspond with a plurality of rows and columns into which each character to be identified and the filed upon which such character reposes are to be divided.

A character field is subject to successive laterally spaced vertical scan cycles and the results pass through a multicolumn shift register. The data stored in the shift register are sensed to determine the instant when a character is centrally located in the register and then to determine the character height. The character is then transferred into an image register in which the location of the character is known with a substantial degree of accuracy.

Once the character is loaded in the image register, it is circulated, one column at a time, through a high speed shift register. The character passes through the high speed shift register once for each of the characters stored in the memory. Each character stored in the memory similarly passes through a second high speed shift register. As the elements of each column from the image register and from memory pass through the two shift registers, the condition of each image column element is compared with its corresponding column element in the memory shift register and with the image column elements above and below. Three comparison circuits are connected to receive the outputs of the three sets of data. Three counters are connected to the comparison circuits to accumulate a count representing the number of times coincidence is absent. Upon completion of the comparison of all characters stored in memory with the character in the image register, the minimum number of mismatches is stored along with a key to the memory character which in comparison produced the minimum.

After the first comparison cycle to include all characters stored in memory, the same routine is repeated during a second cycle but with the character in the image register shifted one column. The same routine is then repeated during a third cycle with the image stored in the image register shifted an additional column. By this means each cell or data bit representing a given area of a character field will have been compared with (a) the condition of a corresponding storage location in memory, and (b) each of the eight surrounding locations.

FIG. 1 is a block diagram of one system embodying the present invention. It will be described in detail as to convey an understanding of the invention and without intending to be limited herein to the particular system.

Characters such as printed by a typewriter are fixed in form. Such characters are scanned and representations thereof stored in a processing system following which the representations of each elemental area of the character are compared with corresponding representations of each of a plurality of characters stored in memory.

For the purpose of this description, it will be assumed that a scanner 10 is a disk-type scanner system. Documents move past a reading station in the direction of line length. Holes in the periphery of a high speed disk repeatedly pass above the printed line to transmit light reflected from the document to a photocell. Each character is effectively scanned a plurality of times from top to bottom, or vice versa. The character portions and background portions of the field thus scanned are sampled in response to a clock synchronized with the disk movement. Each sample will be either a binary 0 or a 1 depending upon whether a white background or a black character portion is sensed at the sample instant. Thus, a plurality of columnar sets of binary data are produced for each symbol scanned. In the system here described, movement of the document and speed of the disk are related so that, in the normal area occupied by a given character on a printed document, there will be 12 scan paths in which 50 samples will be taken, beginning in predetermined time relation to a synchronizing pulse (sync) produced at the beginning of each scan.

In FIG. 1, the output of scanner 10 is applied by way of an amplifier 12 and a gate 14 to the input of a video register 16.

The system of FIG. 1 may be considered to consist of six major sections; (a) video register 16, (b) a horizontal profile and locater section 18, (c) vertical profile and locater 20, (d) image register 22, (e) a processing and character selection logic 24, and (f) master clock 26.

a. Video Register

Video register 16 has storage adequate to store a complete character image and part of the surrounding field in digital form so that each character may be examined as an entity. At each instant when a complete image is horizontally centered in register 16, its vertical position is measured so that further processing can be accomplished with minimum hardware and expenditure of time.

The video register is a twelve column dynamic MOS shift register. Each column is itself a 66 bit serial shift register. The columns are connected serially with the output of column 1 feeding the input of column 2. A selected 50 of the 66 bits in each column will contain video data from a document when in registration therein. The other 16 stages will at that time contain no data, and are used as dummy stages to aid in moving data through the dynamic registers. The selection of the 50 stages is determined by the position of a video window controlled by synchronous timing.

b. Horizontal Profile and Locater

Horizontal profile register 18 maintains a projection along the horizontal dimension of any black portion of the character image. This projection moves along with each character image and is used to determine when the image is horizontally centered in the video register 16 and subsequently centered in the image register 22. The profile is generated by recording the occurence of black any time during a scan. At the end of the scan, the state of this black record is shifted into the horizontal profile register **18*a*. The resulting pattern in this profile register is examined by a horizontal locater 18*b* which detects the most nearly centered position of the profile bit pattern. The profile must be a minimum of three bits wide. It may be up to eleven bits wide with voids permitted in the wider patterns. Positioning in the image register is determined by a horizontal centering counter 18*c*** from the video register position.

c. Vertical Profile and Locater

At the instant that the horizontal profile logic detects the presence of a character image in the center of the video register, a vertical profile cycle is initiated. As the character image then shifts one column in the video register, it is sensed by vertical profile gates **20*a* as it passes out of the top of each column into the bottom of the next column. Two gates are used. One OR's together the existence of any black in columns 1 through 12 of the video register. The other looks for black in columns 4 and 8 or 6 and 10**. By this means, both width and height of black may be used in discriminating between extraneous marks and valid character profile data.

The outputs of the two gates are applied to two eight bit parallel output registers **20*b* which are advanced along with the information in the video register 16. The contents of the vertical profile register 20*b* is sensed with vertical profile logic 20*c*** to determine beginning and end points for the vertical character profile.

During the production of the character profile, a count is made in unit **20*c* of the height of the character, and the position of the bottom (end) of the profile is recorded. This information is used to position the flow of information into image register 22**. The same positional information applies for all columns of a given character, and changes only when a complete new character is detected in the video register. The height count is also compared with several fixed values to determine if it is a full height character, too tall to be a legitimate character, or a vertical mark.

d. Image Register

Image register 22 temporarily stores each character image for comparison with each character of a library of mask patterns. Register 22 has 20 rows, 10 bits per row. Each row is a 10 stage static MOS shift register. The character image data is entered into the image register from the video register by means of a 20 bit serial to parallel image buffer register **22*a*. Character image data flows serially into this register, entering it at a point selected from the previously determined height count. At the end of the previously determined profile, each column of data in the image buffer register is frozen by suitable gating, and then loaded in parallel into the image register 22**. In this way, a vertically centered image is loaded into the image register, one column at a time, as the data flows out of the video register. As each new column is loaded into column 1 of image register 22, the previous contents of column 10 are simply lost, and the remainder of the image moves to column 2 through 10. The image in the image register 22 is shifted horizontally and recirculated at a high rate within the image register, feeding the outputs from column 10 into the inputs in column 1.

e. Character Processing Logic

Character processing logic 24 compares the contents of the image register 22 with mask patterns which are stored in a semiconductor read only memory 24*a*. Each mask pattern is stored in ten columns and eighteen rows of cells. Each cell consists of two bits of information. One bit determines whether the contents of a cell is significant. The state (1 or 0) of the other bit depends on whether a black or white condition should exist at a given field location for a given character. There is one such mask pattern for each character in the machine's repertoire. For a 48 character set, 480 columns of information are stored in the read only memory 24*a*.

Each column consists of a 36 bit word to provide 18 rows by two bits per row. In order to allow for vertical misregistration in image register 22, the 18 rows of the mask pattern are compared with 20 rows of the image register in three different vertical positions; i.e., row 3 through 20 of the image register is compared with the mask pattern; as are rows 2 through 19 and rows 1 through 18. Further, three horizontally different image register positions are employed, one early, one at nominal position, and one a column later than nominal. Thus, each mask pattern is compared with the contents of the image register in nine different positions; i.e., each element in memory 24*a* is compared with the element in image register 22 at a corresponding location and with each of the eight contiguous locations in register 22.

Actual comparison of the mask pattern with the image register is done by loading column 1 of the mask pattern into two 18 bit shift registers 24*b* and 24*c*. Also, the contents of the right-hand column of the image register is loaded into a twenty bit high shift register 24*d*. Shift registers 24*b–d* are then shifted downward serially at a high clock rate. A comparison, bit by bit, is made in unit 24*e* between the image register information and the mask pattern.

The three vertical registration positions are taken by comparing the bottom-most bit of the mask pattern shift registers 24*b* and 24*c* with the three bottom-most bits of the image register shift register 24*d*. This results in three different comparisons, each one of which is tallied in a counter in unit 24*e*. As soon as the first column of image register information has been compared with the corresponding mask column, the image register 22 is advanced and the second column of the read only memory 24*a* is brought out into the shift registers 24*b–d*. The serial bit by bit comparison is repeated with the new column information and any mismatches are added to the count resulting from the first column comparison. This process proceeds until all 10 columns of the image register have been compared with the 10 columns of the first mask. At this point the three mismatch counters contain numbers representing the number of points at which the image register pattern did not match the mask pattern. The smallest of these three numbers is selected in unit 24*f* and stored. The three mismatch counters are then cleared and the second mask pattern is compared to the contents of the image register in the same manner that the first mask pattern was compared. This will result in three new mismatch counts in the counters. The smallest of these three will be selected and stored, and the new count is compared with the count stored from the first mask pattern comparison. If the new count is smaller than the first mask pattern, then the new count will be stored along with the identity of the mask pattern that generated it. This procedure continues throughout the entire contents of the read only memory. The final result is storage of the smallest number of mismatches between the pattern in image register 22 and one of the mask patterns in the read only memory 24*a*.

The complete comparison with the mask patterns is so timed that it occupies less than the time interval of a one disk scan time. After one of the three horizontal comparison sequences is completed, a new column of information is loaded into the image register so that a new 10 column set is present in the image register to be compared with the masks. The new pattern is the same as the former except that column 1 is dropped and column 2 becomes new column 1, columns are all thus shifted one position and a new column 10 is entered.

The entire procedure of comparison with the mask patterns is repeated. At the end of the comparison of the second set, the smallest number of mismatches encountered in either of the two scans is stored. A code as to the identity of the mask that produced it is also stored. A third set (third horizontal position) is taken in the same way to complete the entire character processing cycle. The smallest number of mismatches, along with the identity of the character mask pattern which produced that minimum number of mismatches, is indicated in the output registers of the processing logic.

f. Master Clock Section

A master clock unit contains a 12 megacycle oscillator 26*a* from which timing pulses utilized throughout the system are derived. A countdown unit 26*b* reduces the clock pulse rate by 20. The output of unit 26*b* is utilized in the character processing logic 24, followed by a countdown of six in unit 26*c* which is then followed by a straight binary counter 26*d* with each count in this counter being a so-called master clock time. There are nominally 92½ master clock periods during passage of one hole of the scanning disk in scanner 10 over the normal character field.

With the foregoing understanding of the generalized flow of data as illustrated in FIG. 1, there will now be described a specific embodiment of the system in order that further details of operation may be understood.

In the system illustrated in FIGS. 2–11, reference will be made to timing pulses and control pulses by way of legends generally representing abbreviations of the functions involved. It will be helpful in considering the following description to refer to the legends and their abbreviations as contained in Table I.

TABLE I

| | |
|---|---|
| VWIN | Video window |

| | |
|---|---|
| VIDO | Video signal |
| VIDA | Video data |
| VROR | Video register OR (black in any column, then true) |
| VRWD | Video register width |
| VIRO | Video register output |
| VRHC | Video register horizontally centered |
| HLST | Horizontal locate start (stays clear until image is centered in image register) |
| FSAH | Eight count delay after horizontal centered in image register—allows transfer of potential window location for next line |
| VMARK | Vertical line taller than normal character |
| IRHC | Image register horizontally centered |
| HCO1 | Height counter |
| STB1 | Strobe (1–6) |
| MO6B | Mode 6 counter — (A–D) |
| MIPF | Multiple profile (If on vertical profile find two legitimate profiles—reject) |
| CBOT | Clear bottom |
| VPCY | Vertical profile cycle |
| IBRC | Image buffer register clear |
| HSCE | High speed count E |
| CPFL | Main character profile |
| BRFR | Buffer register freeze |
| IBRS | Image buffer register shift |
| IRSH | Image register shift |
| FHCS | Full height character signal |

FIGURES 2–10

Figure 2:
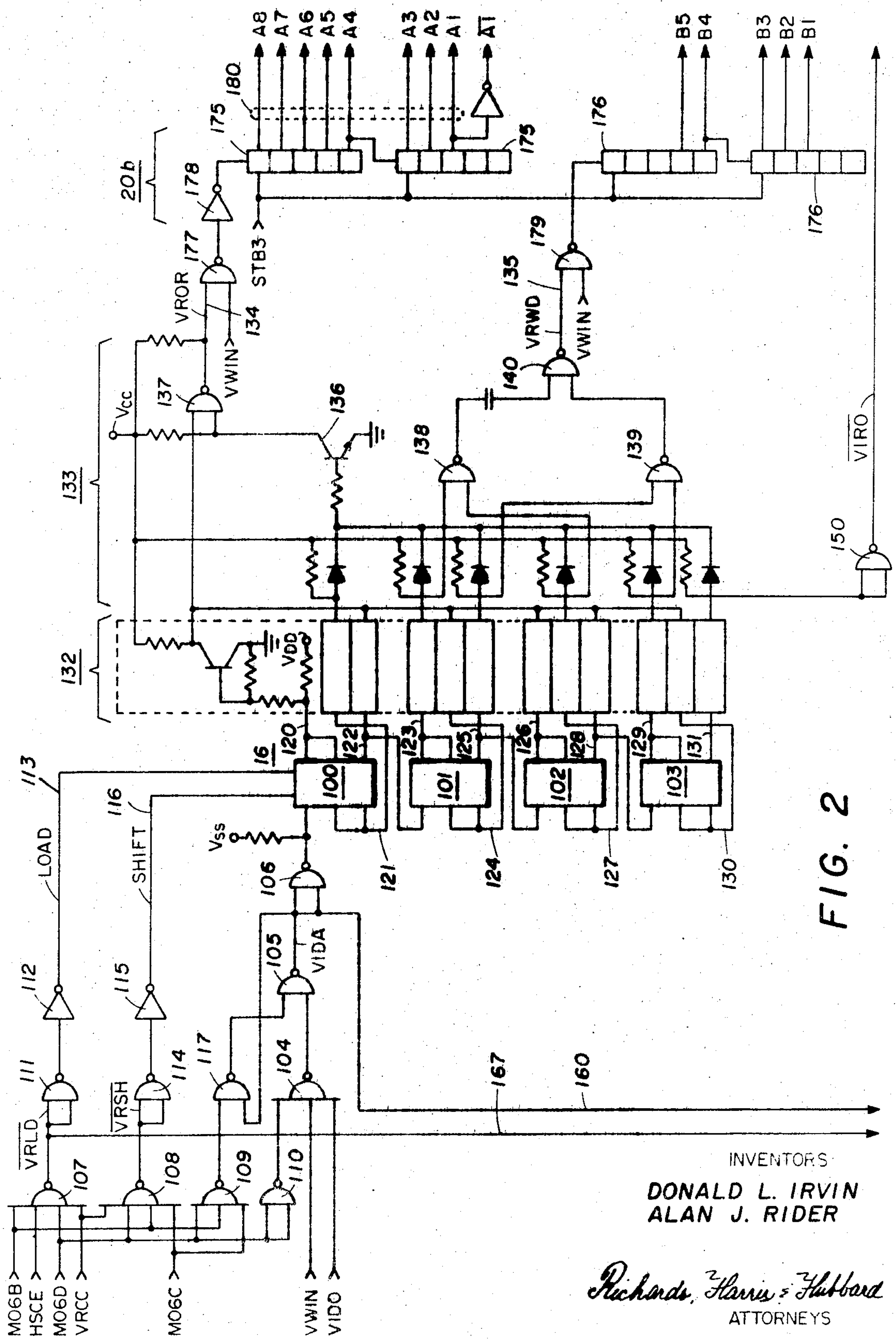
FIGS. 2–10 illustrate in detail the embodiment of the invention of FIG. 1.

In FIG. 2 the video register 16 comprises four MOS shift register units 100–103. A continuous train of video signals from scanner 10 appears on one line leading to a NAND gate 104. Such gates will hereinafter be referred to as NAND 104 to minimize the repetition of the term "gate." A VWIN signal controls the window or time in which video signals in each scan cycle flow to the register 16. NAND 104 is connected by way of NAND 105 and NAND 106 to the input of the first MOS 100.

Timing and control signals MD6B, HSCE, MD6D, VRCC and MD6C are applied by way of a logic network including NANDs 107–110 to develop control states. NAND 107 is connected by way of NAND 111 and amplifier 112 to the load control line 113 leading to the MOS 100. NAND 108 is connected by way of NAND 114 and amplifier 115 to the shift input line 116 leading to MOS 100. NAND 109 is connected by way of NAND 117 to gate 105. NAND 110 is connected at its output to NAND 104.

Video registers 100–103 provide 12 columns in which 50 bits per column are used. The output from the first column appears on line 120. The second column output appears on line 121 and the third column output on line 122. Thus, the unit 16 is so arranged that the first column may be fed back into the second column and the second to the third with an output line leading from each. In a similar manner, the three columns contained in MOS 101–103 are interconnected so that the data appearing at the output of NAND 106 effectively spirals through the video register 16 with the output line from the video register being taken from the lowest or last column of MOS 103, namely line 131.

The signals appearing on lines 120–131 are applied by way of inverters 132 to gates 133. The VROR signal on line 134 and the VRWD signal on line 135 are used to develop a vertical profile of any character centered in the video register 16. The gating in unit 133 leading to line 134 effectively OR's all of the 12 outputs from units 100–103. More particularly, lines 121–131 are effectively connected to the base of a transistor 136 whose collector is connected to OR the signal therefrom with a second signal leading to NAND 137. Similarly, the two signals from the fourth and eighth columns, lines 123 and 127, are NANDed in unit 138. The signals from the sixth and 10th columns, lines 124 and 129, are NANDed in unit 139. The outputs of NANDS 138 and 139 are then connected to NAND 140 whose output appears on line 135 as signal VRWD. The signal VROR on line 134 and signal VRWD on line 135 are applied to vertical profile register **20*b*. The video register 16 is thus employed as a reservoir through which the data from scanner 10** passes while the horizontal locater and vertical profile generator sense the location of the given character.

Figure 3:
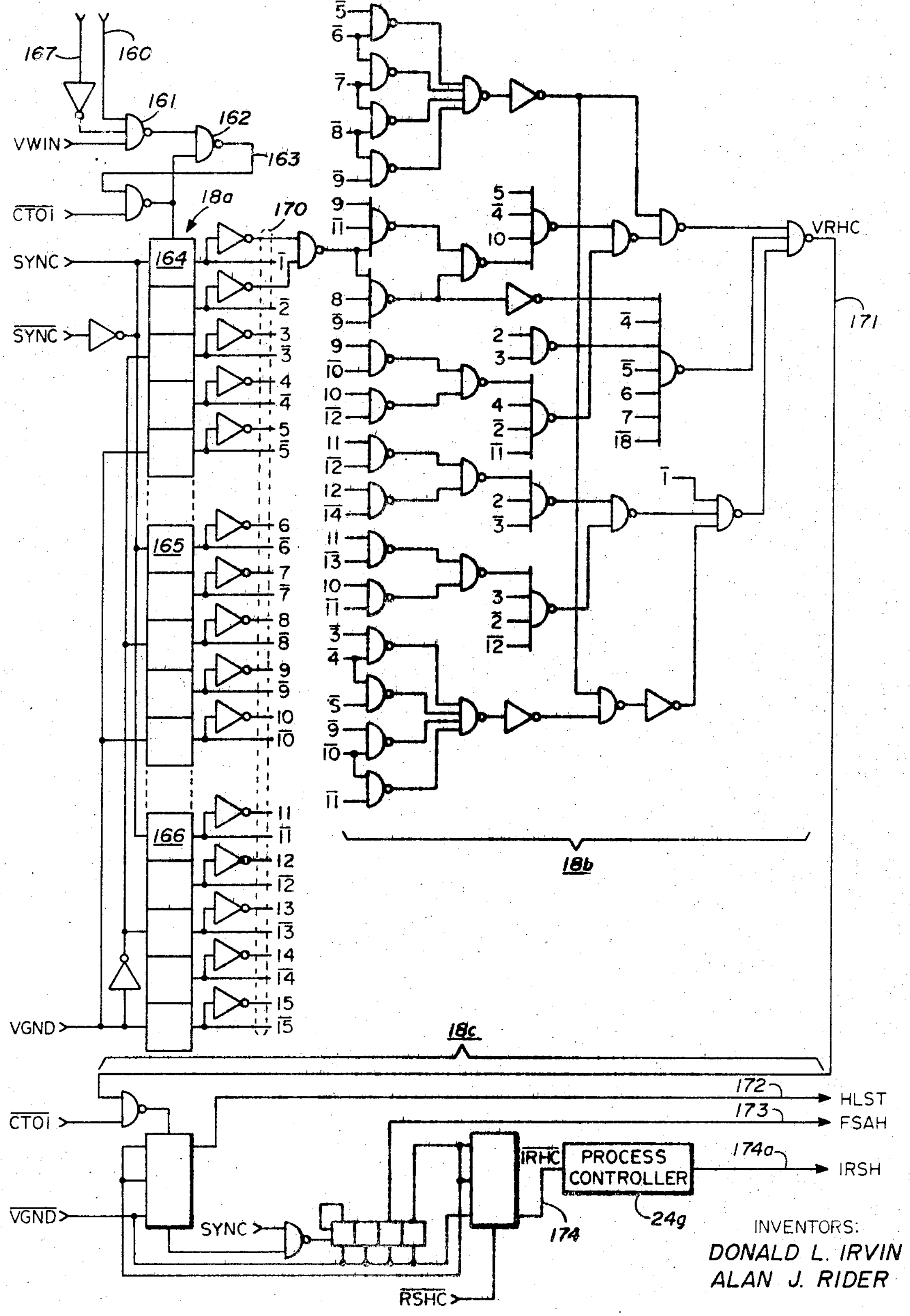

Horizontal Locator — FIG. 3

The horizontal profile register is supplied data from the output of NAND 105 by way of line 160 which leads by way of NANDs 161 and 162 to the input line 163 of the horizontal profile register **18*a*. Register 18*a* comprises three five stage registers 164, 165 and 166**.

Control signal VRLD on line 167 leading from NAND 107 is connected by way of an inverter to NAND 161. Signal VWIN is applied to NAND 161. The operation of the circuit is such that during the time of one scan, related to the signal VWIN, the existence of any black cell signal will set the first stage of unit 164 to a logical 1. Thereafter, the sync pulse operates to shift the signal thus generated to the second stage so that during the second scan cycle, the first stage may again be set dependent upon the presence of a black signal in any portion of the second vertical scan. Such a sequence is continued without interruption. Thus, at all instances there will be a set of output indications on the output lines 170 which will represent a horizontal profile of the last 15 scan cycles.

The states on the output lines 170 are then used in logic comprising the horizontal locater **18*b* to produce a signal VRHC on line 171 which is connected to a horizontal centering counter 18c. Counter 18c having additional signals $\overline{\text{CTO1}}$, $\overline{\text{RSHC}}$ and SYNC produces three output signals HLST, FSAH and $\overline{\text{IRHC}}$ on lines 172, 173 and 174, respectively. Line 174 leads to a process controller 24*g*, shown in detail in FIG. 11. An important output from the controller is signal IRSH on line 174*a*. The signal on line 174 applied to process controller 24*g* signals the instant at which a character is centered horizontally in the image register 22**.

Figures 4, 6:
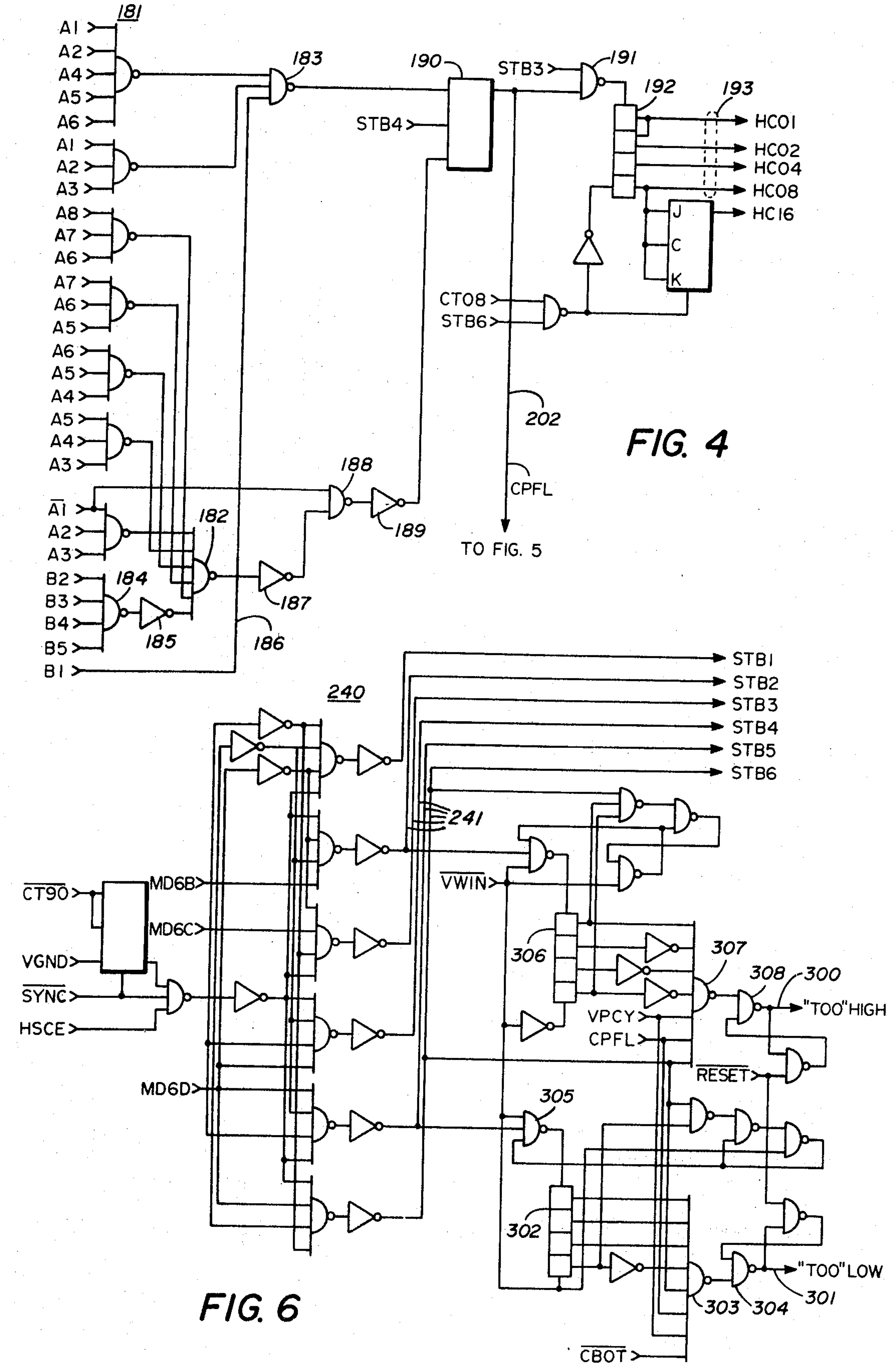

Vertical Locater — FIG. 4

While the horizontal position of the character in the video register 16 is being sensed, signals on lines 134 and 135 are applied to vertical profile register **20*b*. Register 20*b* comprises a pair of like storage registers 175 and 176. Line 134 leads to register 175 by way of NAND 177 and an inverter 178. Line 135 leads to register 176 by way of NAND 179. The registers 175 and 176 each provides 10 bits of storage. They store representations of the vertical profile for 10 scanning cycles. Gate 175 is connected by way of channels 180 to a bank 181 of NANDs which lead selectively to NANDs 182 and 183**.

Register 176 is connected by way of NAND 184 and inverter 185 to NAND 182, and by way of line 186 to NAND 183. NAND 182 is connected by way of inverter 187, NAND 188 and inverter 189 to a flip-flop 190. The flip-flop 190 is connected by way of a NAND 191 to a height counter 192. The output states then developed on output lines 193 indicate the height of the character.

FIG. 5

Figure 5:
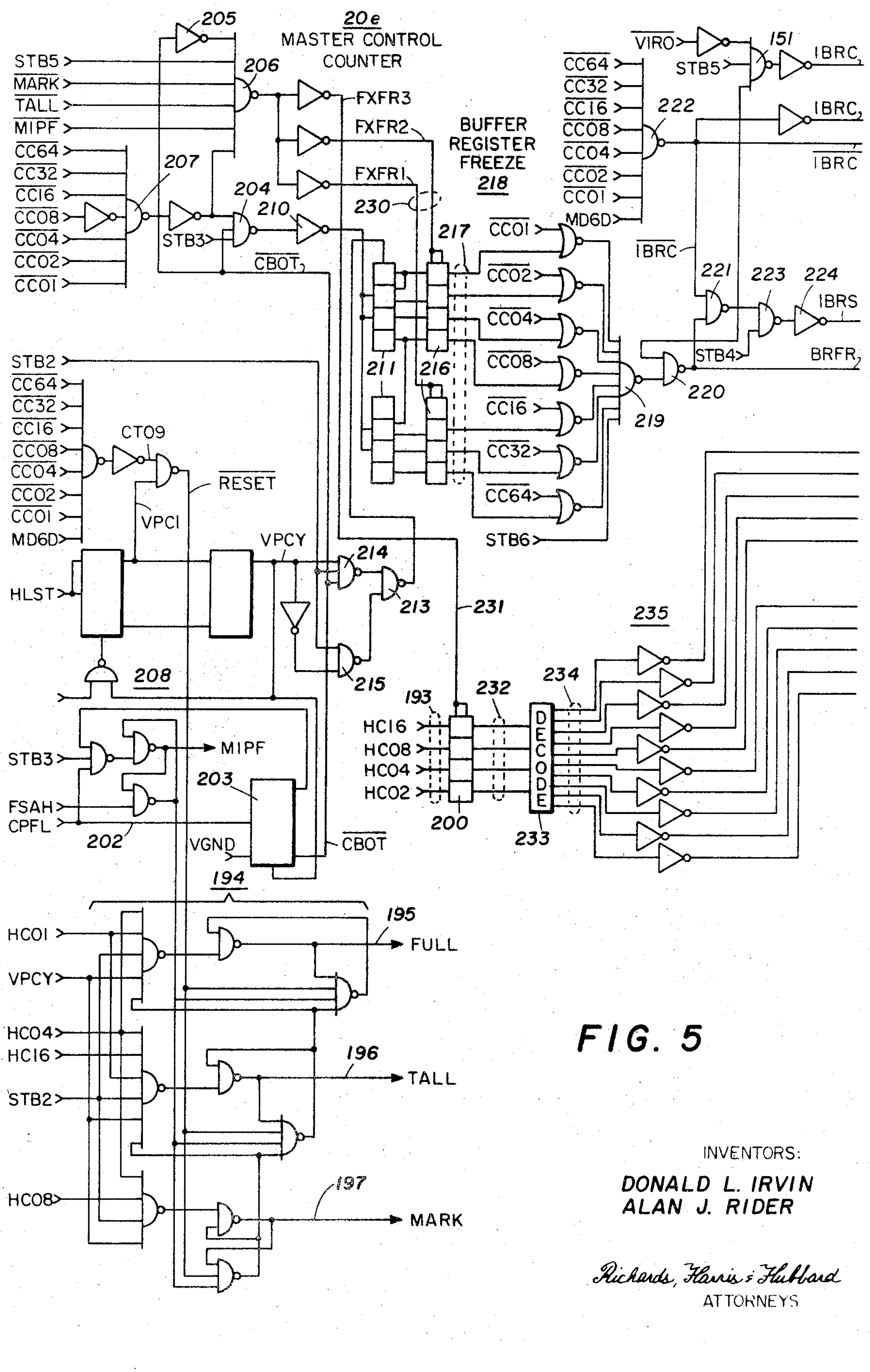

Three of the lines 193, FIG. 4, lead to a logic unit 194, FIG. 5, which develops output signals on three lines 195, 196 and 197 which represent conditions in video register 16 of "full" height, character too "tall" or vertical "mark." The signals on lines 195–197 are then applied to logic in FIG. 5.

Four of lines 193 are connected to a four bit latch register 200, FIG. 5. The latch register 200 is to be latched in a stopped state when the count therein represents the height of the vertical profile of the character horizontally centered in the video register 16. The bottom point on the profile is determined by utilization of the state at the output of flip-flop 190, and more particularly the state on line 202 which leads to a flip-flop 203. The false output of flip-flop 203 is then applied to a NAND 204 in a master control counter 20*e*. The same signal is also applied by way of inverter 205 to a NAND 206.

NAND 206 is supplied at one input by the output of a NAND 207 having selected timing inputs as indicated by the legends $\overline{CC64}$, $\overline{CC32}$, $\overline{CC16}$, $\overline{CC04}$, $\overline{CC02}$ and $\overline{CC01}$. Control inputs also are applied to unit 206, namely STB5, $\overline{mark}$, $\overline{TALL}$ and $\overline{MIPF}$. Signal MIPF indicates the presence of a multiple image and is derived from a control circuit 208, FIG. 5, which is responsive to the signal on line 202, the signal $\overline{FSAH}$ and the strobe signal STB3.

NAND 204 is connected by way of inverter 210 to the inputs to two four bit binary counters 211. An input signal is supplied to counter 211 by way of NAND 213 which in turn is driven by NANDs 214 and 215.

The binary counter 211 is connected in parallel to a four bit latch unit 216. The output lines 217 from latch 216 are fed by way of a bank 218 of exclusive OR units whose outputs are connected to a NAND 219 whose output in turn is connected by way of NAND 220 to a NAND 221. The output of NAND 221 is a buffer register freeze signal ($\overline{BRFR}$). Gate 221 has a timing signal from a NAND 222 connected to one input thereof, namely the signal $\overline{IBRC}$, which provides an image buffer register clear signal. The signal from NAND 221 is applied by way of NAND 223 and inverter 224 to each of the image buffer register units 152–155, FIG. 7.

The output of NAND 206 is connected by way of lines 230 to four bit latch 216. The output is also connected by way of line 231 to four bit latch 200. Latch 200 is connected by way of lines 232 to a four-to-ten line decoder 233. The output lines 234 from decoder 233 are connected by way of inverters 235 to the stages in the bottom two elements of the image buffer register, namely the units 152 and 153, FIG. 7. A code is thus developed on lines 234 which control the entry point of the data from the video register 16 by way of NANDs 150 and 151.

FIG. 6

A timing strobe generator unit 240 is employed, responsive to clock pulses and to a sync pulse to produce, on output lines 241, a set of strobe pulses STB1–STB6. It will be noted that STB2 is employed with an input to NANDs 214 and 215 and STB5 is employed as an input to NAND 206. STB6 is applied to NAND 219, STB4 is applied to NAND 223, STB5 is applied to NAND 151. The strobe gates are otherwise employed at various points throughout the system, as indicated.

FIG. 7

Video register output data is loaded into the image buffer register 22*a*, i.e., units 152–155. It is then transferred by way of lines 156 and a set of input gates to the image register 22.

The combined action of the horizontal centering and vertical centering systems is such that that image will be centered in the image register 22.

Successive columns of the data are fed from line 131 through NAND 150, FIG. 6, as signal $\overline{VIRO}$. The latter signals are fed serially, by way of NAND 151 into the image buffer register 22*a*. The image buffer register comprises four separate units 152–155. They are connected in tandem so that, operating in a conventional shift register mode, the column of data applied to the lowermost bin in unit 152 will be progressively moved upward. Control signals generated in response to the vertical profile register cause the data at a given instant to be frozen in a given position. Thereafter, they are shifted in parallel over lines 156 by way of gates 157 to the image register 22.

Figure 7:
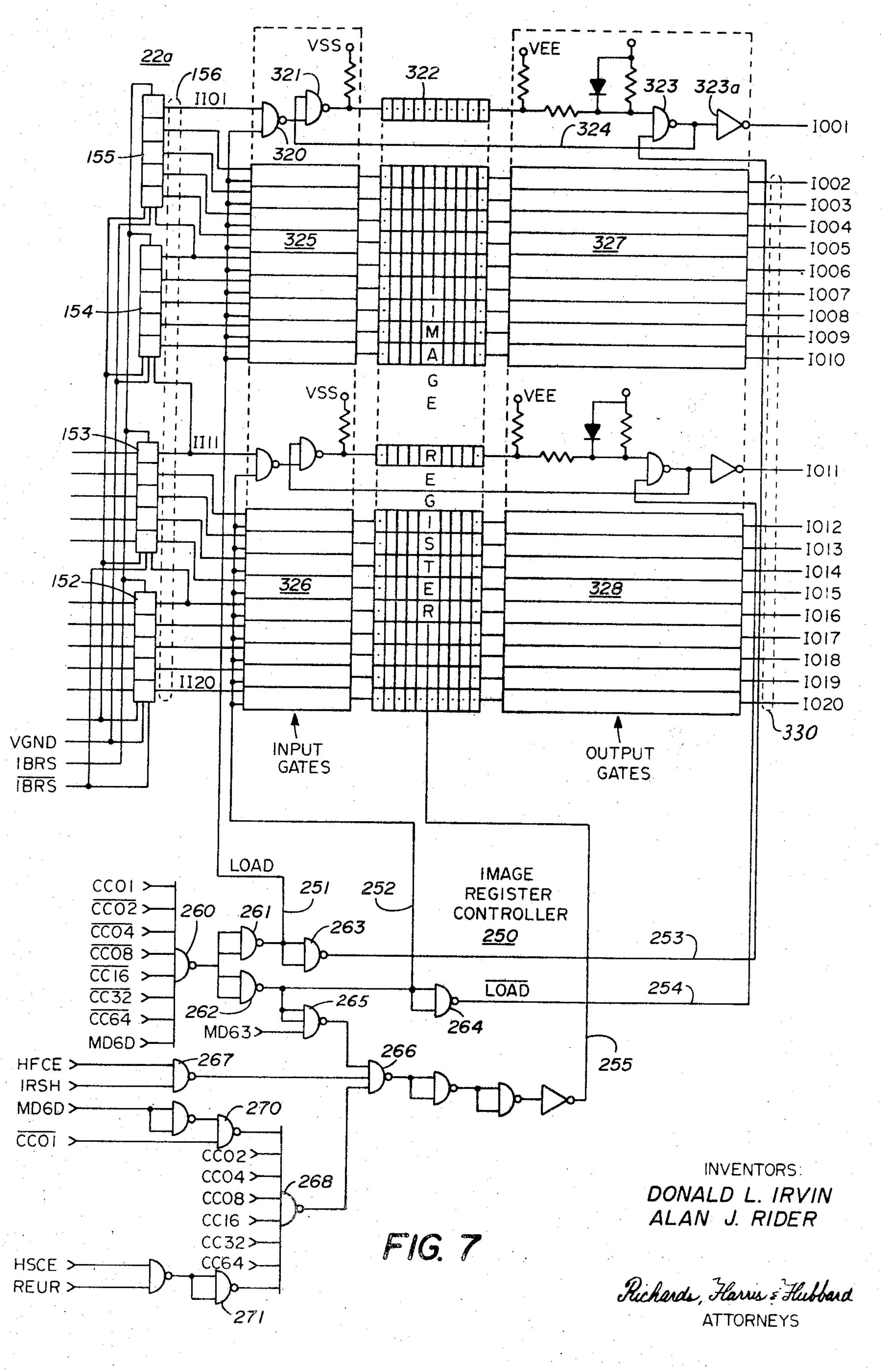

An image register controller 250, FIG. 7, is provided to produce control pulses on lines 251 and 252 which load data from the buffer register 22*a* into the image register 22 and to provide control pulses on lines 253 and 254 which serve in output gates to circulate the data stored in the image register 22.

Controller 250 also is employed to produce on line 255 a control signal for the image buffer 22 which will reverse the order in which data is fed into the image register. More particularly, NAND 260 is provided with eight timing signals at its input and serves to drive two NANDs 261 and 262. The output of NAND 261 provides the control signal on line 251 and also energizes NAND 263 which provides the signal on line 253. Similarly, the output of NAND 262 supplies the signal on line 252 and drives NAND 264 which provides the output on line 254. The output of NAND 262 is also connected by way of NAND 265 to NAND 266. NAND 266 is fed from NAND 267 which has a high frequency clock signal HSCE and an image register control signal IRSH applied thereto. NAND 268 is actuated in response to the output of NANDs 270 and 271 which in turn are excited by timing and control pulses.

The system thus far described provides for the insertion into the image register 22 all characters which have been determined to be acceptable. However, as shown in FIG. 6, if a character is too high or too low, then there will be produced on output lines 300 and 301, respectively, signals which will reject the set of data as nonacceptable. The reject system employs a four bit counter 302 having outputs applied to a NAND 303 along with a vertical process cycle signal VPCY, a main character profile signal CPFL and a strobe signal STB6. In addition, a signal indicating no bottom to the vertical profile has been located, $\overline{\text{CBOT}}$, is also applied to NAND 303. NAND 303 then has an output applied to NAND 304 whose output appears on line 301. Timing signals STB5 and the gate signal $\overline{\text{VWIN}}$ are applied to the counter 302 by way of NAND 305. Similarly, the signal indicating a character too high is produced through use of a counter 306 whose outputs are selectively applied to NAND 307 along with the three control signals common to NAND 303, i.e., VPCY, CPFL, and STB6. The output of gate 307 is applied by way of NAND 308 to line 300.

With the image buffer register 22*a* loaded with contents of a given column from the video register 16, signals are generated on lines 251 and 252 leading from image register controller 250, FIG. 7, for simultaneously transferring all of the signals in the image buffer register into one of the columns of the image register 22.

In FIG. 7 the control circuits for data transfer and recycling thereof are shown for each of two channels II01 and II11. More particularly, the channels 156 lead from the image buffer register 22*a* to input logic leading to the image register 22. Channel II01 leads to a NAND 320 with line 251 also leading to NAND 320. Thus, by enabling line 251, the state in the top bin of image buffer register 155 is passed by NAND 320 to NAND 321 and thence to the image register 322. The output line leading from the top row of image register 322 includes a NAND 323 and an output inverter 323*a* so that the output signal I001 is thus available. The juncture between NAND 323 and inverter 323*a* is connected by way of line 324 to the second input of NAND 321. By this means, the contents of the image register 322 may be circulated. Only when lines 251 and 252 are false will a new column of data be inserted into the image register.

It will be understood that lines 251 and 252 and the circuits from which they extend are provided in order adequately to handle the load involved in the simultaneous transfer of an entire column from the image buffer register 22*a* into the image register 22. Thus, each of the channels II01–II20 leads to the image register by way of input gates represented by the units 325 and 326 and from image register 22 by way of output gates 327 and 328.

Identical circuitry is illustrated for channels II11 as for II01. The same circuits are provided for all remaining channels shown in block form. Thus, the data representing a single column at any instant appears on the output lines 330 for the character stored in the image register 22.

FIG. 8

Figure 8:
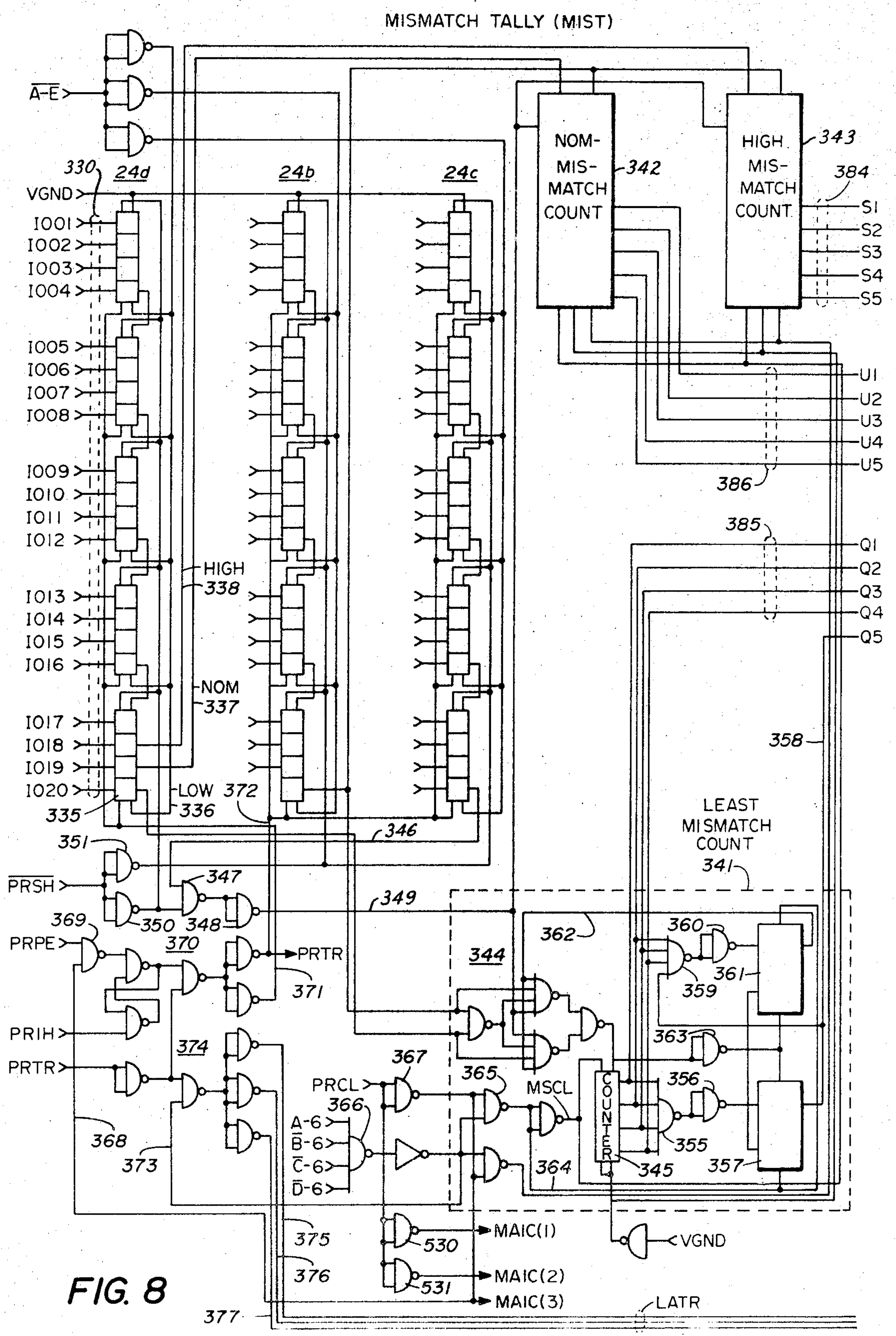

Referring now to FIG. 8, the output lines 330 are selectively connected to the inputs of shift register 24*d*. It will be noted that shift register 24*d* includes five units of four bits each. Columnar data from image register 22 may thus be transferred to register 24*d* and at the same time recirculated from the last column to the first column in the image register 22. The states thus set in the shift register 24*d* are then to be shifted downward for comparison with corresponding signals stored in the shift registers 24*b* and 24*c*. The data in units 24*b* and 24*c* is transferred from the read only memory for comparison column by column with the data stored in the image register 22.

The bottom unit in register 24d, namely the unit 335, has output lines 336, 337 and 338 leading from the bottom three cells thereof. The lines 336–338 are labeled Low, Normal and High. The signals on lines 336–338 are to be compared with the signal in the bottom cell of register 24*b*. For this purpose, three mismatch count units 341, 342 and 343 are provided. The low line 336 is connected to an exclusive OR network 344 at the input to the mismatch count unit 341. The normal line 337 leads in a similar manner to the normal mismatch count unit 342. The high line 338 similarly is connected to the high mismatch count unit 343.

The three units 341–343 are identical. Thus, only unit 341 is shown in detail. The exclusive OR circuit 344 leads to an input of a mismatch counter unit 345. The last cell in register 24*c* is connected by way of line 346 to a NAND 347 and thence by way of NAND 348 and line 349 so as to be ANDed with the output of the first stage of the exclusive OR gate 344. Like gates are provided in each of units 342 and 343.

A clock signal $\overline{\text{PRSH}}$ is applied by way of NAND 350 to NAND 347 and to each of the units in register 24*d*. The clock signal is also applied by way of NAND 351 to each of the units in registers 24*b* and 24*c*. This signal serves synchronously to shift data initially placed in registers 24*b*–24*d* downward at the high clock rate for comparison and application to the mismatch count units 341–343. The output of counter 345 is connected by way of NANDs 355 and 356 to a flip-flop 357 whose true output is connected by way of line 358 along with outputs from counter 345 to a NAND 359. The output of NAND 359 is connected by way of NAND 360 to a second flip-flop 361 whose false output is applied by way of line 362 to two NANDs in the exclusive OR unit 344. The output of the exclusive OR unit is also connected by way of NAND 363 to a control input to each of the flip-flops 357 and 361. Another control input therefor is supplied by way of line 364 leading from NAND 365. The signal from NAND 365 is dependent upon an input from the process controller 24*g* on lines leading to NAND 366 which represent the count of the particular column under process and a clock pulse PRCL applied by way of NAND 367. The signal PRCL serves to clear the counter after a given character in the image register 22 has been compared with one of the characters from the read only memory. The output of NAND 367 is also applied by way of line 368 along with PRPE to NAND 369 in a further control circuit 370 to provide signals on lines 371 and 372 to control inputs to the registers 24*c* and 24*d*.

In FIG. 8 it will be noted that a single least mismatch counter 341 is employed to tally the number of mismatches between the bottom bit in register 24*b* and the bottom bit in register 24*d*. When such a single counter is employed, a total of 18 timing pulse periods are required in order to run the contents of the shift registers 24*b* and 24*d* to the bottom bin. It will be understood that two, three or more least mismatch counters could be used and the totals in such additional counters summed so that the total time required for the comparison is reduced by a factor equal to the number of counters employed. Such counters would have their inputs connected at different points along the height of counters 24*b* and 24*d* so that there is a simultaneous comparison of bits in the bottom bins and of bits in intermediate bins.

FIG. 9

Figure 9:
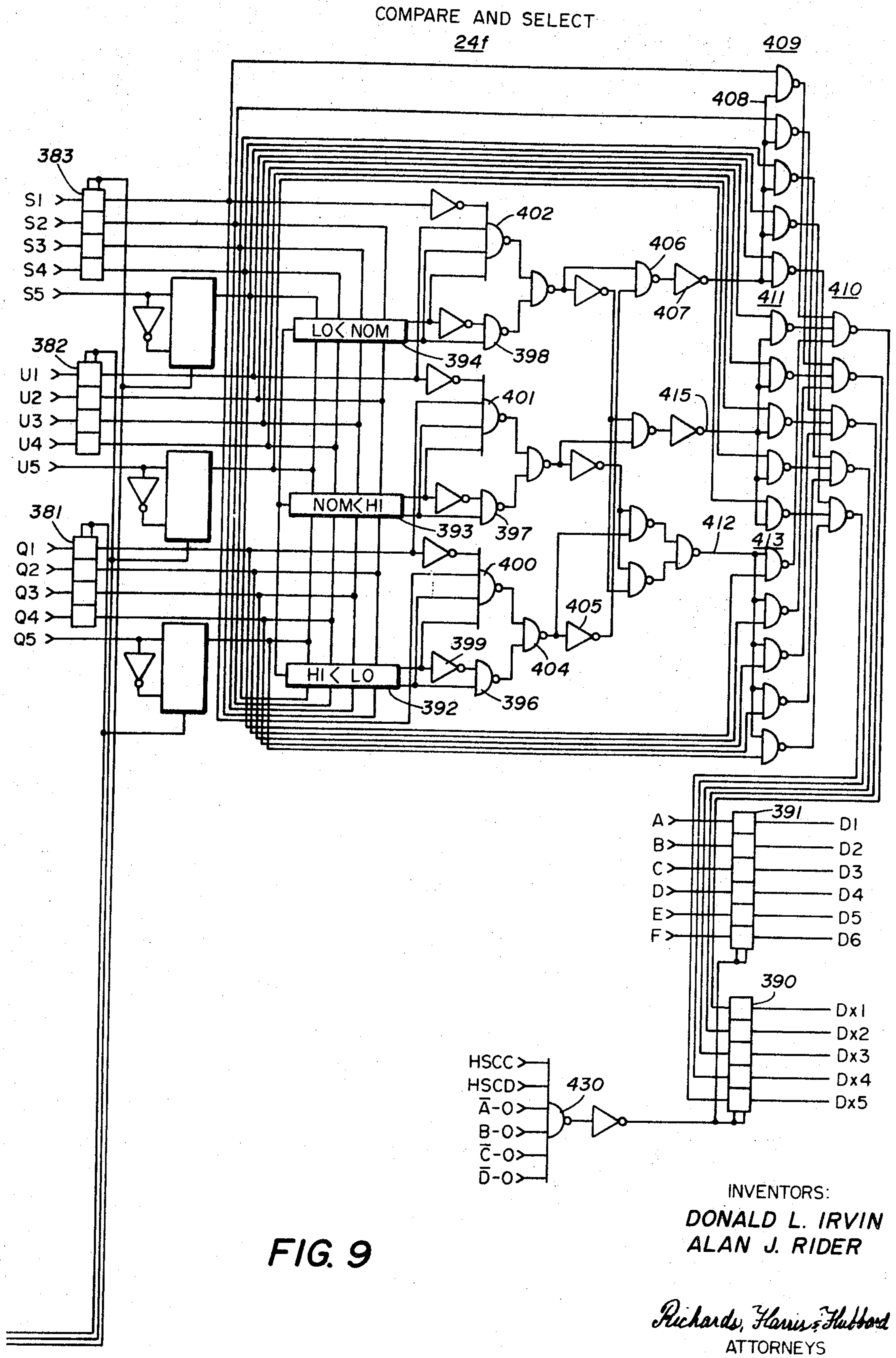

The output of NAND 366 is connected by way of line 373 to a control network 374 to produce latch register signals on lines 375, 376 and 377 which lead to FIG. 9 where they are applied as controls for storage units 381–383.

Lines 384, 385 and 386 also lead to storage units 381–383. Units 381–383 store the total number of mismatches encountered in the comparison between the image stored in the image register and one of the images stored in the read only memory.

As indicated earlier, it is the object to identify the characters stored in memory for which the number of mismatches is a minimum. By utilizing the high, nominal and low mismatch counters, each bit stored in the register 24*d* simultaneously is compared with the bit at the corresponding location in the register 24*d*. This leads to identification of the character in the image register 22 even though it may not be in an exact vertical position. It can either be one location above or one location below the normal location and still provide an output indication lower than on the normal line. A number is stored in each of units 381–383. Each number represents the number of mismatches encountered.

The circuit including the compare and select unit 24*f* functions to identify and then store in register 390 the count representing the lowest of the three numbers representing the mismatches. A code identifying the character in read only memory for which the count is a minimum is simultaneously stored in the register 391. This is accomplished by utilizing three comparators 392, 393 and 394. Output lines from storage unit 381 are connected to units 392 and 393. The output lines from storage unit 382 are connected to comparators 393 and 394, and the output lines from storage unit 383 are connected to comparators 394 and 392.

Each of the comparators 392–394 has a true and false output. Comparator 392 will have a true output if the total of the mismatches for comparisons in unit 343 are less than the total of the comparisons in the unit 341. Comparator 393 will have a true output if the comparisons for the nominal position are less than the comparisons for the high position. The comparator 394 will have a true output if the comparisons for the low position are less than for the nominal position.

The output lines from the comparators 392–394 are connected to NANDs 396–398, respectively. In each case, the true output line is connected by way of an inverter, such as inverter 399. The true and false output lines from comparator 392 are also connected to NAND 400 along with the low order bit from storage unit 383 and the complement of the low order bit $Q_1$ from storage unit 381. Similarly, NAND 401 has as inputs the low order bit from storage unit 381 and a complement of the low order bit $U_1$ from storage unit 382. NAND 402 has as an input the low order bit from storage unit 382 and the complement of the low order bit $S_1$ from storage unit 383. NANDs 396 and 400 are connected by way of NAND 404 and inverter 405 to NAND 406. The output of NAND 406 is applied by way of inverter 407 to a line 408 which is an enable line leading to a bank 409 of gates which will serve to transfer the count in storage unit 383 by way of a bank of NANDs 410 to storage register 390. In a similar manner, an enable signal is generated on line 415 to enable transfer, by way of a bank 411 of NANDs, of the contents of the storage register 382 into the storage register 390. Finally, there is produced on line 412 an enable signal for transfer, by way of NANDs 413, of the contents of the storage unit 381 into the register 390.

Figure 10:
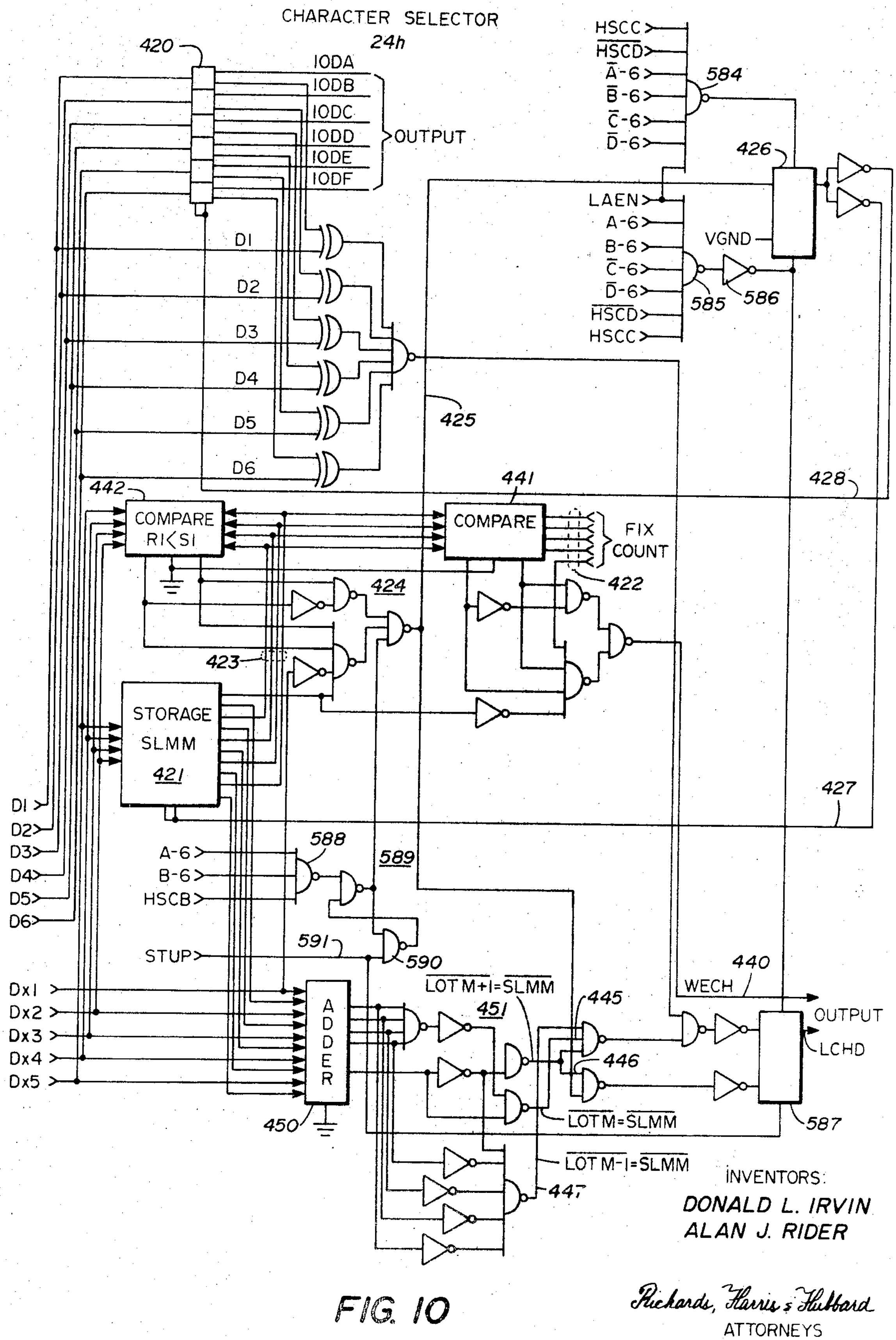

The character selector unit 24*h*, FIG. 10, employs the information stored in register 390 to control the code stored in a register 420. The contents of the register 420 represent the identity of the character in read only memory most closely corresponding with the character stored in the image register. This control involves storing the contents of register 390 in a register 421 if the contents of register 390 represents a lower number of mismatches than any number previously stored in register 421. Output lines DX1–DX5 from register 390 are connected to the storage unit 421. The lines DX2–DX5 are also connected as one set of inputs to a comparator 422. Output lines 423 from storage register 421 are also connected as a second set of inputs to comparator 422. The comparator 422 has true and false output lines which lead to a logic network 424 which also serves to compare the signal on the input line DX1 from register 390 with the corresponding output signal from storage unit 421.

If a previous stored lowest mismatch count in unit 421 is greater than the mismatch count stored in register 390, then there will be produced on line 425 a control state which sets flip-flop 426. The false output line of flip-flop 426 is then connected by way of line 427 to the storage unit 421 to transfer into storage unit 421 the count from unit 390. At the same time, a signal on line 428 is applied to the storage unit 420 to transfer thereto the code stored in register 391.

It will be remembered that the code stored in register 391 is the address location in the read only memory of the character for which the new lowest mismatch count has been determined.

Thus, the register 420 stands ready to receive a new address any time during interrogation of the library stored in the read only memory. The character selection operation is undertaken for each character found to have been centered in the video register 16. At the end of the triple interrogation of the entire library of the read only memory for each character centered in the register 16, the input-output unit then utilizes the code stored in memory 420 to signify the character in the image register.

It will be noted that a NAND 430 is employed to enable reading the data stored in registers 390 and 391 into comparator 422 and register 420, respectively.

In addition to the foregoing character identification operation, some quality controls are also provided in the character selector. A first quality control signal appears on an output line 440 if the character in the image register is a weak character. Such an evaluation of the character in memory is performed by applying the count from storage register 421, the stored lowest mismatch count, to a second comparator 441. A second set of inputs to the comparator 441 is applied by way of lines 442. This set of inputs represents a fixed count and can be selected by an operator. It can be set at a count of 12, for example. If the number 12 is greater than the stored lowest mismatch count from register 421, then the signal on line 440 will be true, thus indicating that the character in the image register has more mismatches with respect to the characters stored in the read only memory than 12 and is therefore not a strong character but rather represents a weak image. In such a case, the operator may wish to question the identification of the character and perhaps not utilize the results of the character selection operation. Obviously, numbers other than twelve may be used.

A second quality control signal results from comparing the stored lowest mismatch count from the storage register 421 with the new lowest mismatch count stored in register 390 to determine whether the number of mismatches is the same or if not the same, whether they differ only by ±1. A signal appears on line 445 if they are the same, on line 446 if the stored lowest mismatch is one greater than the new count, and on line 447 if the stored lowest mismatch is one less than the new count. When such small differences are encountered in the character selection operation, the operator may wish to question the identification of the character selected. The latter quality control operation is carried out by applying the contents of register 390 to an adder 450 and by applying the compliments of the contents of the storage register 421 also to adder 450 such that the difference in counts will then appear at the output. The latter signals are then applied to a logic unit 451 to produce the appropriate output signal on one of lines 445–447.

It will be remembered that in the image register operations, a reversing control signal was employed. This was described as permitting the feeding of data from the read only memory to the registers for comparison in the reverse direction. This is desirable because in some readers, a line is scanned in a first direction, from the beginning to the end of the line. During the return of the reader, however, the succeeding line is scanned in the reverse direction, i.e., from the end to the beginning. In such case, the characters represented by storage in the read only memory must be extracted and read into the shift registers for comparison in the reverse order. Thus, the system may be used with a disk-type reader where successive scans are accomplished with various types of document transport units. In some systems, a single line will be read with the document being passed a single time past a reading station. In others, multiple lines may be read. The present invention accommodates reading in a forward direction only or in a forward direction followed by a reverse direction.

Process Controller — FIGS. 11*a*–11*c*

Each sequential step described is advanced by timing signals from the master clock 26. However, to transfer data from the image register 22 for comparison with character representation from the read only memory **24*a*, the process controller 24*b*** generates sequential control signals.

Timing signals HSCC and HSCD from the master clock are applied to NAND 500. Also applied to inputs of the NAND 500 are the input register horizontal control signal and a master clock timing signal CT08. An output of NAND 500 is one input to NAND 502 which has a second input from NAND 504. NAND 504 has an input timing signal $\overline{\text{HSCC}}$ from an inverter amplifier 505 and a second input timing signal HSCD.

An output from NAND 502 is applied to a nine bit mask address counter 508 consisting of binary counters 510–512. The binary count of the counters 510–512 advances by a timing signal HSCB applied to terminal $\overline{\text{INA}}$. The advancing binary count is applied to latch gates 513–521. Except for one output from the counter 510, the remaining output lines from the address counter 508 are also connected to inputs of inverting amplifiers 522–529. Latch gates 513–516 have the $\overline{\text{C}}$ terminal connected to NAND 530, FIG. 8. Latch gates 517–520 have the $\overline{\text{C}}$ terminal connected to NAND 531 and the latch gate 521 has the $\overline{\text{C}}$ input connected to NAND 367.

Outputs of the latch gates 513–521 are selectively applied to NAND 533 and NAND 534 of a register control circuit 535. NAND 533 is enabled during a regular reading cycle by a signal REVE, and the NAND 534 is enabled for the reverse reading cycle by the signal $\overline{\text{REVE}}$. NANDs 533 and 534 have outputs applied to NAND 536 which has an output connected to NAND 537. NAND 537 also has inputs HSCC and $\overline{\text{HSCD}}$ from the master clock. An output of NAND 537 is applied to NAND 538 in a latch circuit including a NAND 539. NAND 539 receives an input from NAND 540 which in turn has inputs from the latch gate 513, the circuit 370 (FIG. 8, on line 372) and from an inverting amplifier 541. Amplifier 541 inverts the output of NAND 542 having inputs from the inverting amplifiers 522–529. As a result of receiving the IRHC signal by NAND 500, NANDs 538 and 539 generate IRSH on line **174*a*, FIG. 3. The IRSH on line 174*a*** is the image shift register control, as explained.

Upon completion of the shifting of data into the image register 22, process control signals are generated for initiating the mismatch tally counter. NAND 544 having inputs from NANDs 500 and 504 and also from NAND 545 generates the PRPE signal as one input to NAND 369, FIG. 8. The process controller 24g also generates a mismatch tally inhibit signal PRIH at the output of NAND 546. NAND 546 has inputs from the latch gates 513–521, selectively, and timing signals HSCC and $\overline{\text{HSCD}}$, the latter from the inverter 506.

As previously explained, the mismatch tally counters compute a minimum mismatch for the character in the image register 22 and then repeat the operation with the image transposed one position. In the process controller 24g, a scan counter 547, having an input from NAND 500, consists of flip-flops 548 and 549 along with NAND 550. The flip-flops 548 and 549 each has a true and false output which is applied to inputs of NANDs 551 and 552. Outputs of NANDs 551 and 552 are connected to inputs of NAND 553 which has an output to one input of the NAND 504 and an input to NAND 555 of a latch enable circuit 556.

Additional inputs of the NAND 555 comprise outputs of NAND 544. A timing signal HSCD is also applied to NAND 555. Two remaining inputs to NAND 555 are generated by a column counter circuit 557.

The latch enable circuit 556 also includes the NAND 563 having inputs from the latch gates 513–521, selectively. An output of NAND 563 is one input to a latch circuit including NANDs 564 and 565. NANDs 564 and 565 circulate to generate the LAEN (latch enable) signal for the character selector **24*h***.

The column counter circuit 557 includes a binary counter 558 having a terminal $\overline{\text{INA}}$ coupled to the timing signal HSCD. The $R_o$ inputs of the counter 558 are connected to the output of the NAND 502. Sequentially advancing outputs of the counter 558 are applied to inputs of inverting amplifiers 559–562. Outputs of the inverter amplifiers 559 and 562 are inputs to NAND 555 of the latch enable circuit 556.

Outputs of the column counter 557 are also applied to the character selector 24h for sequencing the operation thereof for character recognition. Outputs of the amplifiers 559–562 are applied to input terminals of NAND 584, FIG. 10. Further, NAND 584 receives timing signals HSCC and $\overline{\text{HSCD}}$ along with the latch enable signal LAEN from NAND 564. NAND 584 advances the register 426. Outputs A–6, B–6, $\overline{\text{C}}$–6 and $\overline{\text{D}}$–6 from the column counter 557 are also applied to NAND 585. NAND 585 receives the latch enable signal from NAND 564 and timing signal $\overline{\text{HSCD}}$ and HSCC. An output of NAND 585 is inverted in an amplifier 586 and applied to the register 426 and a register 487.

Outputs A–6 and B–6 of the column counter 557 are applied to NAND 588 of the character selector **24*h*. NAND 588 has a timing signal HSCB as an input and is part of a start-up circuit 589 which includes a NAND gate 590 having a processer start-up input signal STUP on a line 591 from NAND 500, FIG. 11*a***.

In addition to NAND 555, outputs of the column counter 557 are applied to inputs of NAND 366, FIG. 8. These signals are also inputs to NAND 566. NAND 566 has a signal $\overline{\text{A}\cdot\text{E}}$ at an input terminal. The $\overline{\text{A}\cdot\text{E}}$ signal appears at the output of an inverter amplifier 567. An output of NAND 566 is inverted in the amplifier 568 and applied to the INA terminal of a binary counter 569 of the ID code counter circuit 570.

The ID code counter circuit 570 includes flip-flops 571 and 572 and an inverting amplifier 573. An output of NAND 502 is applied to the $R_o$ terminals of the counter 569 and inverted in the amplifier 573 and applied to the $\overline{\text{R}}$ terminal of the flip-flops 571 and 572. The ID code counter circuit 570 generates the inputs to NAND 430, FIG. 9, for advancing the registers 390 and 391. The true outputs of the counter circuit 570 appear on terminals 574–579 and the false outputs appear at amplifiers 580 and 581.

In addition to NAND 430, outputs of the ID code counter circuit 570 are applied to NAND 582 which connects to the $\overline{\text{C}}$ terminal of the flip-flops 548 and 549 of the scan counter 547 through an inverting amplifier 583. This resets the scan counter 547 for a subsequent character recognition.

After identifying a character from the read only memory library, an input/output circuit 592 generates an enable signal at the output of NAND 593. NAND 593 is a latch circuit including NAND 594 which has an input connected to the output of NAND 500. NAND 593 has one input connected to the output of NAND 595 which has inputs A–7 and B–7 from the scan counter 547.

To reset the horizontal counter **18*c*, NAND 596 has one input to the output of NAND 544 and a second input to the output of the inverter amplifier 567. The output of the NAND 596 is the signal $\overline{\text{RSHC}}$ for resetting the horizontal centering counter 18*c*. This output is also one input to NAND 597 of a latch circuit including NAND 598. The second input to the NAND 598 is the clock signal $\overline{\text{CT09}}$ from the master clock 26. An output of NAND 598 is applied to inputs of NAND 504**.

Through the sequential operation of the various circuits of the processing controller **24*g*, the character recognition process advances through the various states in the described order. The scan counter 527, the column counter 557 and the ID code counter 570 generate the enabling signals to the mismatch tally counters, the compare and select circuit 24*f* and the character selector 24*h*. The register control 535 generates the IRSH on the line 174*a***.

FIG. 12

In order to assist in understanding the invention and the foregoing description, reference is made to the accompanying timing diagrams of FIGS. 12–14.

The scanner 10 normally produces a synchronizing pulse at a given point relative to the beginning of each vertical scan across a character field. Responsive to that sync pulse, a number of different operations take place. As a base for such operations, the master clock, FIG. 1, provides an output at a 12 MHz rate. As illustrated in FIG. 12 and identified by 12 MHz, the 12 MHz clock output is applied to a divider which generates a 6 MHz output rate. This 6 MHz output is then applied to a high speed counter that has five outputs HSCA, HSCB, HSCC, HSCD and HSCE. The period of each of these outputs is 1.67 microseconds. Delay circuitry in the high speed counter staggers the start of each of the outputs HSCA–HSCE. They are delayed sequentially by two periods of the 12 MHz signal. Thus, there are available a number of different combinations of timing pulses of different periods for generating the various control signals utilized in the system.

A new column of information enters the video register 16 at the completion of successive scan cycles. Each scan cycle is divided into 92 separate intervals and is completed in 925 μ-seconds. The first portion and the last portion of each scan cycle is not used in the operation of the video register 16. However, the intermediate 50 portions of the 92 intervals in each scan cycle are used and an output indication is produced when a given character is horizontally positioned in the video register. In response to the output indication, a vertical profile is generated for the character centered in the video register. This operation takes place during the scan cycle following detection of a centered character. The address in the video register for the bottom of the centered character is then determined. As explained, this information is then employed to select the input point to the image buffer register **22*a*. The image in the video register is transferred serially into the image buffer register 22*a* and thence to the image register 22. When a complete character is stored in image register 22, comprising 20 rows and 10 columns, a high speed comparison operation is then performed. For each HSCE signal, FIG. 12, a column of data is loaded into shift register 24d from image register 22. At the same time, a column of data is shifted from the read only memory 24a** into a corresponding shift register.

A comparison of the data in the shift registers now takes place in response to the PRSH signal, FIG. 12. Additional columns of data are shifted into the register until one character in the read only memory has been compared with the data in the image register 22. The comparison of one character from the read only memory being completed in 1.67 microseconds. For all 480 characters in the read only memory 24a, the comparison with each representation in the image register 22 occupies about 800 microseconds. As above noted, there are 925 microseconds during each scan cycle. Thus, the comparison operation in response to the PRSH signal is a high speed operation. The HSCE cycle is of intermediate speed. The scan cycle is relatively slow speed.

FIG. 13

The PRTR signal, FIG. 13, is a process transfer signal comprising a single pulse to load the shift registers 24b–d in parallel from the image register and from the read only memory, respectively. The PRCL is a process clear signal which appears a fixed time after the PRTR pulse to clear the shift registers.

Following PRCL, another series of PRTR pulses are illustrated. It will be noted that the first set of PRTR pulses has the first pulse coincident with IRSH. There then follows a train of pulses that extend throughout the entire process cycle in the comparison operation. The PRTR pulses in the second series show the 479th, 480th and 481st sequences. The trailing end of the IRSH signal is also shown. This indicates the end of the scan cycle.

A processor shift signal PRSH, comprising a burst of 18 pulses at the 12 MHz rate, shifts the data bits serially downward, as explained, in the shift registers 24b–c.

In FIG. 8 it will be noted that the unit 374 has three outputs leading to the latch terminals on counters 381–383. This signal is the pulse LATR of FIG. 12, i.e., a latch transfer signal.

The MSCL pulse is a mismatch clear signal which serves to clear the three counters, such as the counter 345 in the unit 341.

The last waveform of FIG. 13 is the IRSH signal on line 174a. As explained, the IRSH pulse is an image register shift signal which begins at the start of the process cycle and loads the image register to recycle itself 48 times. Thus, the IRSH signal is true during 48 image register shift cycles.

The HSCE signal of FIG. 12 has been illustrated on a shortened time scale in FIG. 13. Its relationship to the PRTR signal on line 2 has also been illustrated. The HSCB is a high speed counter phase B signal which is employed for start-up of the scan operations.

The signals $\overline{C}\cdot D$ represents the product of ANDing of $\overline{HSCC}$ and HSCD. The A·E signal similarly represents the ANDing of HSCA and HSCE.

IRHC is an image register horizontal center signal. This signal is produced when an image is detected at the center of the image register and initiates the processing cycle. It is applied to the input of the process controller 24g. More particularly, the signal IRHC starts 10 scans after an image is centered in the video register 16.

The next line on FIG. 13 illustrates a reset pulse which resets all counters during the first scan. The pulse $\overline{C}\cdot D$ represents the ANDing of HSCC and $\overline{HSCD}$. A signal SSCS is produced on the first scan cycle only.

FIG. 14

FIG. 14 illustrates the HSCE and HSCB phase signals on a still more compressed time scale than of FIG. 13. The reset pulse and the SSCS pulse, indicating the beginning of the first scan, is also illustrated. It will be noted that IRSH begins coincidence with one of the HSCE pulses and is spanned by an advance ID code pulse on the first scan only. A clock "FF to last latch" pulse is also illustrated. The first pulse of the latter series initiates a force function. The second initiates an interrogation function. If the mismatch count in the comparison operation is smaller than a set value, then the number is replaced by the second latch pulse.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of loading a multicolumn multirow image register with character representations for comparison with representations of a set of characters stored in predetermined locations in a memory which comprises:

a. sequentially scanning along vertical lines successive laterally spaced portions of a character field,
b. generating a sync signal in predetermined time relation to the start of each scan cycle,
c. serially introducing signals produced by scanning into a shift register having rows and columns of storage locations substantially in excess of those in said image register,
d. continuously sensing for the presence of a character portion in all columns of said first register for producing a center signal when a set of character portions is centered in said shift register,
e. establishing a vertical profile of the centered character by sensing in all rows of said shift register in response to said center signals,
f. continuously transferring data from said shift register to an image register buffer at a point dependent upon the height of said profile,
g. establishing for said centered character the address of the trailing extremity of said profile,
h. freezing each column of information in said buffer register in dependence upon said address of said trailing extremity, and
i. parallel shifting the contents of said buffer register into said image register at a predetermined time following the next sync pulse.

2. The method of loading of multicolumn multirow image register with character representations as set forth in claim 1 including the step of selecting those image locations of the shift register containing the introduced signals in accordance with a video window synchronous timing signal for establishing the vertical profile.

3. The method of loading a multicolumn multirow image register with character representations as set forth in claim 1 wherein the step of continuously sensing the presence of a character portion includes recording the occurrence of a "black" portion anytime during a scan.

4. The method of loading a multicolumn multirow image register with character representations as set forth in claim 3 wherein the step of continuously sensing the presence of a character portion further includes shifting the black record into a horizontal profile register, and examining the resulting pattern in the profile register with a horizontal locator to detect the most nearly centered position of the horizontal profile signal pattern.

5. The method of loading a multicolumn multirow image register with character representations as set forth in Claim 1 wherein the step of establishing a vertical profile of the centered character includes the step of sensing the vertical profile to determine beginning and end points for the vertical character profile.

6. The method of loading a multicolumn multirow image register with character representations as set forth in claim 5 including the step of sensing the full height of the centered character to determine if it is a full height character, a too tall to be legitimate character, or a vertical mark.

7. The method of establishing a data base in an image register for comparison with character representations stored in a memory which comprises:

a. serially scanning each character to be recognized along a plurality of adjacent laterally spaced paths,
b. generating a sync signal in predetermined time relation to the start of each scan cycle,
c. developing a multiple level code indicative of the presence or absence of character portions at spaced points along each scan,
d. serially transferring said code to a multicolumn, multirow shift register,
e. sensing the instant that said code representing a complete character is centered in said shift register,
f. serially transferring the output of said shift register to a column buffer register following occurence of said centered signal,
g. establishing a code for the height of the centered character, to establish an input location of said column buffers,
h. establishing a code for the location of the bottom of said centered character,
i. freezing the contents of said buffer register following each sync pulse in dependence upon said height and said bottom location, and
j. shifting in parallel the contents of said buffer into said image register at a predetermined time after each sync pulse.

8. The method of establishing a data base in an image register as set forth in claim 7 wherein said developed code is represented by "black" signals to indicate the presence of a character portion and "white" signals to indicate the absence of a character portion.

9. The method of establishing a data base in an image register as set forth in claim 8 wherein the step of sensing the instant that said code representing a complete character is centered includes the step of:

recording the occurrence of "black" signals during each scan cycle,
shifting the black record into a horizontal profile register at the end of a scan cycle, and
examining the black record in the profile register to detect the most nearly centered position of the profile pattern.

10. The method of establishing a data base in an image register as set forth in claim 7 including the step of tallying the various levels of the multiple level code in each of the columns of said register and for selected columns thereof to discriminate between extraneous marks and a valid character.

11. A method of establishing a data base in an image register as set forth in claim 7 including the step of establishing by said height and said bottom location codes if a character is a full height character, too tall to be a legitimate character, or a vertical mark.

12. Apparatus for loading a multicolumn multirow image register with character representations for comparison with representations of a set of characters stored in predetermined locations in a memory, comprising:

a character reader for sequentially scanning along vertical lines successive laterally spaced portions of a character field during a scan cycle,
a timing generator for generating a sync signal in a predetermined time relation to the start of each scan cycle,
a shift register having rows and columns of storage locations substantially in excess of those in the image register for serially receiving signals produced by said character reader,
a horizontal profile register for sensing the presence of a character portion in all columns of said shift register,
a horizontal locator responsive to said horizontal profile register for producing a center signal when a set of character portions is centered in said shift register,
an image register buffer for serially receiving data from said shift register in response to the center signal of said horizontal locator, and
means for parallel shifting the contents of said buffer register into the image register at a predetermined time following the next sync pulse.

13. Apparatus for loading a multicolumn multirow image register as set forth in claim 12 including vertical profile means responsive to said center signal to establish a vertical profile of the centered character for generating the address of the trailing extremity of the vertical profile thereby fixing the location of the centered character from the shift register into the image register.

14. In a character recognition system, comprising:

means for sequentially shifting into a multicolumn image register at a known vertical and horizontal location a columnar code representing successive vertical scans of an unknown character,
means for storing in memory multicolumn sets of codes, one for each of a plurality of characters to be identified,
means for cyclically loading into a first shift register the columns from the image register,
means for cyclically loading into a second shift register the columns from a first of said sets and from succeeding sets in said memory,
means for comparing each code in said first shift register in a nominal position, element for element, with each code in said second shift register in the nominal position where the rate of shifting said first and second shift registers is at a rate higher than the rate of loading into said shift registers by a multiple at least as great as the number of cells in a column in said memory, means for simultaneously comparing each code in said first register, element for element, at two additional locations, one above the nominal location and one below the nominal location, with each code in said second shift register simultaneously with the comparison at the nominal location, means for shifting the columnar code in said first shift register and means for recycling said first and second means for additional comparison, means for accumulating a count signal of each comparison of the number of times the compared elements satisfy a matched criteria, and means for storing a key to the memory set for which said count is optimum for all comparisons.

15. In a character recognition system as set forth in claim 14 wherein said means for storing a key to the memory set includes means for comparing the accumulated count signal for each code with all other code sets and discarding all count signals other than the optimum count.

16. In a character recognition system having a character reader, the combination comprising:

an image register comprising an array of elements each capable of storing multiple conditions, a shift register having rows and columns of storage locations substantially in excess of those in the image register for serially receiving signals produced by said character reader, means for producing a centering signal when a set of character portions is centered in said shift register, means for sequentially shifting the contents of said shift register into the image register at a known location, means for storing in memory multicolumn sets of codes, one set for each of a plurality of characters to be identified, means for cyclically loading into a second shift register the columns from said image register, means for cyclically loading into a third shift register the columns from a first of said sets and successively from succeeding sets in said means for storing, means for comparing each code in said second shift register, element for element, with each code in said third shift register, means for shifting said second and third shift registers for comparison of the codes therein at a rate higher than the rate of loading into said shift registers by a multiple at least as great as the number of cells in a column in said means for storing, means for accumulating a count signal of the number of times the compared code elements mismatch, means for shifting the columnar codes in said first shift register and means for recycling said second and third shift registers for additional comparison and accumulation of count signals of the number of times the compared code elements mismatch, and means for storing a key to the memory code set for which said count is optimum.

In a character reader as set forth in claim 16 including means for simultaneously comparing each code in said second shift register, element for element, at two additional locations, one above the nominal location and one below the nominal location, with each code in said third shift register at a nominal location, and means for accumulating a count signal for each comparison of the number of times the compared elements satisfy a matched criteria.

18. In a character recognition system having a character reader, the combination comprising:

an image register comprising an array of elements each capable of storing multiple conditions, a shift register having rows and columns of storage locations substantially in excess of those in the image register for serially receiving signals produced by said character reader, means for producing a centering signal when the set of character portions is centered in said shift register, means for shifting the contents of said shift register into the image register at a known location, a memory having a plurality of storage arrays for storing sets of representations of characters to be encountered in said system, a second shift register for receiving columns one at a time of the storage conditions in said image register array, a third shift register for receiving columns one at a time of sets of representations from said memory, comparison means for comparing the stored conditions in a nominal location of each of said second and third shift registers, second comparison means for comparing the storage conditions in a location one above the nominal location of said second shift register with the nominal location of said third shift register, third comparison means for comparing the storage conditions at a location one below nominal in said second shift register with a nominal location in said third shift register, control means for cyclically shifting the columns of said image register to said second register and for reading columns from said memory into said third shift register at a first rate and for shifting storage conditions and representations to said shift registers in said one location at a second higher rate than said first rate by a multiple at least as great as the number of cells in a column, counter means responsive to said first comparison means to accumulate representations of the number of times the stored conditions and the simulations satisfy a matched criteria, second counter means responsive to said second comparison means to accumulate representations of the number of times the stored conditions at one above the nominal location and the simulations satisfy a matched criteria, third counter means responsive to said third comparison means to accumulate representations of the number of times the stored conditions at one below the nominal location and simulations satisfy a matched criteria, and means to sense and store a key to the set of simulations for which number of representations is optimum.

19. In a character recognition system as set forth in claim 18 including means for shifting by column the stored conditions in the image register and for recycling said comparison means for each column shift of stored conditions in the image register.

20. In a character recognition system as set forth in claim 18 wherein said means for storing a key to the memory set includes means for comparing the accumulated count signal for each code set with all other code sets and discarding all count signals other than the optimum count.

21. In a character recognition system as set forth in claim 18 wherein said comparison means includes means for comparing a subsequent code set accumulated count with a stored accumulated count from a previous comparison and storing the optimum count of the two compared.

* * * * *